United States Patent
Tsuchizawa et al.

(10) Patent No.: US 10,227,106 B2
(45) Date of Patent: Mar. 12, 2019

(54) BICYCLE CONTROLLER AND BICYCLE DRIVE DEVICE

(71) Applicant: Shimano Inc., Sakai, Osaka (JP)

(72) Inventors: Yasuhiro Tsuchizawa, Osaka (JP); Hiroshi Matsuda, Osaka (JP); Kazuhiro Fujii, Osaka (JP); Satoshi Shahana, Osaka (JP); Hiroyuki Miyoshi, Osaka (JP); Mitsuru Tauchi, Osaka (JP)

(73) Assignee: Shimano Inc., Osaka (JP)

( * ) Notice: Subject to any disclaimer, the term of this patent is extended or adjusted under 35 U.S.C. 154(b) by 43 days.

(21) Appl. No.: 15/440,653

(22) Filed: Feb. 23, 2017

(65) Prior Publication Data
US 2017/0247080 A1    Aug. 31, 2017

(30) Foreign Application Priority Data

Feb. 29, 2016 (JP) .................................. 2016-037108
Aug. 25, 2016 (JP) .................................. 2016-165056

(51) Int. Cl.
| | |
|---|---|
| *B62M 6/50* | (2010.01) |
| *B60L 7/18* | (2006.01) |
| *B62K 23/02* | (2006.01) |
| *B62M 6/55* | (2010.01) |
| *B62M 6/90* | (2010.01) |
| *B62M 9/122* | (2010.01) |

(Continued)

(52) U.S. Cl.
CPC .............. *B62M 6/50* (2013.01); *B60L 3/102* (2013.01); *B60L 3/106* (2013.01); *B60L 7/18* (2013.01); *B60L 11/007* (2013.01); *B60L 15/20* (2013.01); *B60L 15/2009* (2013.01); *B60L 15/2054* (2013.01); *B62K 23/02* (2013.01); *B62M 6/55* (2013.01); *B62M 6/90* (2013.01); *B62M 9/122* (2013.01); *B62M 9/132* (2013.01); *B60L 2200/12* (2013.01); *B60L 2240/12* (2013.01); *B60L 2240/14* (2013.01); *B60L 2240/421* (2013.01); *B60L 2240/423* (2013.01); *B60L 2240/465* (2013.01); *B60L 2240/486* (2013.01); *Y02T 10/645* (2013.01); *Y02T 10/72* (2013.01); *Y02T 10/7275* (2013.01)

(58) Field of Classification Search
None
See application file for complete search history.

(56) References Cited

U.S. PATENT DOCUMENTS

| | | | |
|---|---|---|---|
| 2008/0071436 A1* | 3/2008 | Dube ....................... | B62M 6/45 701/22 |
| 2017/0001682 A1* | 1/2017 | Hayslett ................ | B60L 11/007 |
| 2017/0151999 A1* | 6/2017 | Kinpara ................... | B62M 6/60 |

FOREIGN PATENT DOCUMENTS

| | | |
|---|---|---|
| JP | 06-201712 A | 7/1994 |
| JP | 10-024887 A | 1/1998 |

(Continued)

*Primary Examiner* — Richard M Camby
(74) *Attorney, Agent, or Firm* — Global IP Counselors, LLP

(57) ABSTRACT

A bicycle controller and bicycle drive device that improves the stability of the behavior of a bicycle. The bicycle controller includes an electronic control unit that reduces the output of a motor, which is configured to assist in propulsion of the bicycle, in accordance with an angular acceleration of a rotary body. The rotary body is included in a human power transmission path extending from an input for human power to a coupling portion coupled to a drive wheel.

31 Claims, 16 Drawing Sheets

(51) Int. Cl.
*B62M 9/132* (2010.01)
*B60L 3/10* (2006.01)
*B60L 11/00* (2006.01)
*B60L 15/20* (2006.01)

(56) References Cited

FOREIGN PATENT DOCUMENTS

| JP | 10-338185 A | 12/1998 |
| JP | 2001-114184 A | 4/2001 |
| JP | 2004-142634 A | 5/2004 |
| JP | 2004-243921 A | 9/2004 |
| JP | 2004-322809 A | 11/2004 |
| JP | 4365113 B2 | 11/2009 |
| JP | 2014-128994 A | 7/2014 |
| JP | 2014-139068 A | 7/2014 |

\* cited by examiner

BICYCLE CONTROLLER AND BICYCLE DRIVE DEVICE

CROSS-REFERENCE TO RELATED APPLICATIONS

This application claims priority to Japanese Patent Application No. 2016-037108, filed on Feb. 29, 2016, and Japanese Patent Application No. 2016-165056, filed on Aug. 25, 2016. The entire disclosures of Japanese Patent Application Nos. 2016-037108 and 2016-165056 are hereby incorporated herein by reference.

BACKGROUND

Field of the Invention

The present invention generally relates to a bicycle controller and a bicycle drive device.

Background Information

A bicycle drive device typically includes a motor, which assists in the propulsion of a bicycle, and a bicycle controller that controls the motor. One example of a conventional bicycle controller for a bicycle drive device is disclosed in Japanese Laid-Open Patent Publication No. 6-107266.

Sometimes the wheel of a bicycle may slip or spin depending on the road surface condition, such as the friction coefficient of the road surface. When the bicycle includes the above-mentioned bicycle controller, such slipping or spinning of the wheel will result in the torque of the motor affecting the behavior of the bicycle.

SUMMARY

One object disclosed of the present invention to provide a bicycle controller and a bicycle drive device that improve the stability of the behavior of a bicycle.

A first aspect of the present invention is a bicycle controller including an electronic control unit configured to reduce an output of a motor, which is configured to assist in propulsion of a bicycle, in accordance with an angular acceleration of a rotary body included in a human power transmission path extending from an input for human power to a coupling portion coupled to a drive wheel.

The electronic control unit reduces the output of the motor in accordance with the angular acceleration of the rotary body. This reduces the output of the motor when the drive wheel slips or spins. Thus, the stability of the behavior of the bicycle is improved.

In a second aspect of the bicycle controller according to the preceding aspect, the rotary body includes a crankshaft.

The rotary body includes the crankshaft. This allows slipping or spinning of the drive wheel to be easily detected from the angular acceleration of the crank.

In a third aspect of the bicycle controller according to any one of the preceding aspects, the electronic control unit is configured to perform a braking operation using the motor when reducing the output of the motor in accordance with the angular acceleration of the rotary body.

The electronic control unit has the motor perform a braking operation when reducing the output of the motor in accordance with the angular acceleration of the rotary body. Thus, when the drive wheel slips or spins, the rotational speed of the drive wheel can be quickly decreased to a suitable speed.

In a fourth aspect of the bicycle controller according to any one of the preceding aspects, the electronic control unit is configured to perform a regenerative operation as at least a part of the braking operation.

The braking operation includes a regenerative operation. This improves the power efficiency of the bicycle controller.

A fifth aspect of the bicycle controller according to any one of the preceding aspects further includes a first sensor configured to output a signal corresponding to a rotational speed of the rotary body. The electronic control unit is configured to control the motor in accordance with the signal outputted from the first sensor.

The electronic control unit easily obtains the rotational speed of the rotary body with the first sensor when controlling the motor in accordance with the signal output from the first sensor, which outputs a signal corresponding to the rotational speed of the rotary body.

In a sixth aspect of the bicycle controller according to any one of the preceding aspects, the electronic control unit is configured to control the motor in accordance with the human power.

The electronic control unit controls the motor in accordance with the human power. This improves the accuracy for detecting slipping or spinning of the drive wheel in comparison with when detecting slipping or spinning of the drive wheel from only the angular acceleration of the rotary body.

A seventh aspect of the bicycle controller according to any one of the preceding aspects further includes a second sensor configured to output a signal corresponding to the human power. The electronic control unit is configured to control the motor in accordance with the signal output from the second sensor.

The electronic control unit easily obtains the human power with the second sensor when controlling the motor in accordance with the signal output from the second sensor, which outputs a signal corresponding to the human power.

In an eighth aspect of the bicycle controller according to any one of the preceding aspects, the electronic control unit is configured to reduce the output of the motor upon determining the angular acceleration has become higher than or equal to a first predetermined value.

The electronic control unit reduces the output of the motor upon determining the angular acceleration has become higher than or equal to the first predetermined value by using the first predetermined value that is suitable for slipping or spinning of the drive wheel. This allows the output of the motor to be lowered in an appropriate manner when slipping or spinning occurs in the bicycle.

In a ninth aspect of the bicycle controller according to any one of the preceding aspects, the electronic control unit is configured to reduce the output of the motor upon determining the angular acceleration has become higher than or equal to a first predetermined value and, at the same time, a decrease amount of the human power per unit time has become larger than or equal to a second predetermined value.

The electronic control unit reduces the output of the motor upon determining the angular acceleration has become higher than or equal to the first predetermined value and, at the same time, the decrease amount of the human power per unit time has become larger than or equal to the second predetermined value. The use of the second predetermined value that is suitable for slipping or spinning of the drive wheel allows the output of the motor to be lowered in an appropriate manner when slipping or spinning occurs in the bicycle.

In a tenth aspect of the bicycle controller according to any one of the preceding aspects, the electronic control unit is configured to reduce the output of the motor in accordance with a crank phase.

The electronic control unit reduces the output of the motor in accordance with the crank phase. This allows the output of the motor to be lowered in an appropriate manner.

An eleventh aspect of the bicycle controller according to any one of the preceding aspects further includes a third sensor configured to output a signal corresponding to the crank phase. The electronic control unit is configured to control the motor in accordance with the signal output from the third sensor.

The electronic control unit easily obtains the crank phase with the third sensor when controlling the motor in accordance with the signal output from the third sensor, which outputs a signal corresponding to the crank phase.

In a twelfth aspect of the bicycle controller according to any one of the preceding aspects, the electronic control unit is configured to reduce the output of the motor in accordance with the crank phase upon determining the angular acceleration has become higher than or equal to a first predetermined value.

The electronic control unit reduces the output of the motor in accordance with the crank phase upon determining the angular acceleration of the rotary body has become higher than or equal to the first predetermined value.

In a thirteenth aspect of the bicycle controller according to any one of the preceding aspects, when reducing the output of the motor in accordance with the angular acceleration, the electronic control unit is configured to control the motor to lower the output of the rotary body more greatly upon determining the crank phase corresponds to a middle position between a top dead center and a bottom dead center than upon determining the crank phase corresponds to one of the top dead center and the bottom dead center.

When the crank phase is at a middle position between the top dead center and the bottom dead center, the human power is large. This increases the output of the motor that is in accordance with the angular acceleration of the rotary body. When reducing the output of the motor in accordance with the angular acceleration, the electronic control unit controls the motor to lower the output of the rotary body more greatly upon determining the crank phase corresponds to a middle position between the top dead center and the bottom dead center than upon determining the crank phase corresponds to one of the top dead center and the bottom dead center. This allows the output of the motor to be lowered in an appropriate manner even when slipping or spinning occurs when the crank phase is at a phase corresponding to the top dead center or the bottom dead center.

In a fourteenth aspect of the bicycle controller according to any one of the preceding aspects, when reducing the output of the motor in accordance with the angular acceleration, the electronic control unit is configured to reduce the output of the motor in steps.

When reducing the output of the motor in accordance with the angular acceleration, the electronic control unit reduces the output of the motor in steps. This reduces the load used for computations as compared with when the output of the motor is continuously changed in accordance with the angular acceleration of the rotary body.

In a fifteenth aspect of the bicycle controller according to any one of the preceding aspects, when reducing the output of the motor in accordance with the angular acceleration of the rotary body, the electronic control unit is configured to brake the drive wheel with a brake device that brakes the drive wheel.

The electronic control unit controls the rotational speed of the drive wheel with the brake device that brakes the drive wheel. This shortens the time for decreasing the rotational speed of the drive wheel in an appropriate manner as compared with when controlling the rotational speed of the drive wheel by controlling only the motor.

In a sixteenth aspect of the bicycle controller according to any one of the preceding aspects, the human power transmission path includes a gear change mechanism, and the rotary body is located at an upstream side of the gear change mechanism in the human power transmission path.

The rotary body is located at an upstream side of the gear change mechanism in the human power transmission path. Thus, the motor can be controlled in accordance with the rotational speed taken before the gear change mechanism changes gears.

In a seventeenth aspect of the bicycle controller according to any one of the preceding aspects, when reducing the output of the motor in accordance with the angular acceleration of the rotary body, the electronic control unit is configured to control the motor in accordance with a rotational speed of the drive wheel and a rotational speed of a crank.

When reducing the output of the motor in accordance with the angular acceleration of the rotary body, the electronic control unit controls the motor in accordance with the rotational speed of the drive wheel and the rotational speed of the crank. This allows determination of spinning or slipping of the drive wheel to be performed by comparing the rotational speed of the drive wheel and the rotational speed of the crank. Thus, motor control is executed in a manner suitable for spinning and slipping of the drive wheel.

In an eighteenth aspect of the bicycle controller according to any one of the preceding aspects, the electronic control unit is configured to reduce the output of the motor more greatly upon determining the rotational speed of the drive wheel is higher than an estimated value of the rotational speed of the drive wheel calculated from the rotational speed of the rotary body and a gear ratio of the bicycle than upon determining the rotational speed of the drive wheel is lower than or equal to the estimated value.

The behavior of the bicycle when the drive wheel is in contact with the road surface becomes unstable as the rotational speed of the drive wheel increases. The electronic control unit reduces the output of the motor more greatly upon determining the rotational speed of the drive wheel is higher than the estimated value than upon determining the rotational speed of the drive wheel is lower than or equal to the estimated value. This stabilizes the behavior of the bicycle in an appropriate manner when the drive wheel is spinning.

In a nineteenth aspect of the bicycle controller according to any one of the preceding aspects, the electronic control unit is configured to reduce the output of the motor in accordance with the angular acceleration of the rotary body upon determining the gear change mechanism is not functioning to decrease a gear ratio of the bicycle.

The electronic control unit does not lower the output of the motor in accordance with the angular acceleration of the rotary body upon determining the gear change mechanism is functioning to decrease a gear ratio of the bicycle. This reduces erroneous detection of slipping or spinning of the drive wheel when the rotational speed of the drive wheel increases as the gear ratio decreases.

In a twentieth aspect of the bicycle controller according to any one of the preceding aspects, the electronic control unit is configured to control the motor in accordance with the human power, and the electronic control unit is configured to change a response speed of the motor with respect to a change in the human power changes as the human power decreases in accordance with the angular acceleration of the rotary body.

The electronic control unit reduces the output of the motor by changing the response speed of the motor with respect to a change in the human power as the human power decreases when slipping or spinning of the drive wheel occurs.

In a twenty-first aspect of the bicycle controller according to any one of the preceding aspects, the electronic control unit is configured to increase the response speed upon determining the angular acceleration of the rotary body becomes higher than or equal to a third predetermined value.

The electronic control unit increases the response speed upon determining the angular acceleration of the rotary body becomes higher than or equal to the third predetermined value. This allows the human power to be easily lowered when the angular acceleration of the rotary body becomes higher than or equal to the third predetermined value.

In a twenty-second aspect of the bicycle controller according to any one of the preceding aspects, the electronic control unit is configured to stop execution of a control for increasing the response speed upon determining a predetermined period elapses after increasing the response speed.

The electronic control unit stops execution of the control for increasing the response speed upon determining the predetermined elapses after increasing the response speed. Thus, when the drive wheel slips or spins, the response speed of the motor does not remain high over a period that is too long.

In a twenty-third aspect of the bicycle controller according to any one of the preceding aspects, the electronic control unit is configured to stop execution of a control for increasing the response speed upon determining a crank arm of the bicycle passes one of a top dead center and a bottom dead center after increasing the response speed.

The electronic control unit stops execution of the control for increasing the response speed upon determining the crank arm of the bicycle passes one of the top dead center and the bottom dead center after increasing the response speed. Thus, when the drive wheel slips or spins, the response speed of the motor does not remain high over a period that is too long.

In a twenty-fourth aspect of the bicycle controller according to any one of the preceding aspects, the electronic control unit is configured to control the motor in accordance with the human power and reduces the output of the motor by repetitively increasing and decreasing the output of the motor in accordance with the angular acceleration of the rotor.

The electronic control unit repetitively increases and decreases the output of the motor to lower the output of the motor. This limits unintentional reducing of the output of the motor when the drive wheel slips or spins for a short period as the rider rides the bicycle along a rough road surface.

In a twenty-fifth aspect of the bicycle controller according to any one of the preceding aspects, in accordance with a rotational speed of the drive wheel, the electronic control unit is configured to stop execution of a control for reducing the output of the motor in accordance with the angular acceleration of the rotary body.

In accordance with the rotational speed of the drive wheel, the electronic control unit stops execution of the control for reducing the output of the motor in accordance with the angular acceleration of the rotary body. Thus, the reducing of the output of the motor can be ended when slipping or spinning of the drive wheel ends.

In a twenty-sixth aspect of the bicycle controller according to any one of the preceding aspects, the electronic control unit is configured to reduce the output of the motor upon determining the angular acceleration becomes higher than or equal to a first predetermined value. In accordance with a rotational speed of the drive wheel, the electronic control unit is configured to stop execution of a control for reducing the output of the motor in accordance with an angular acceleration of the drive wheel. In accordance with one of the rotational speed of the drive wheel and a rotational speed of a crank before the angular acceleration becomes higher than or equal to the first predetermined value, the electronic control unit is configured to stop execution of the control for reducing the output of the motor in accordance with the angular acceleration of the rotary body.

In accordance with the rotational speed of the drive wheel or the rotational speed of the crank before the angular acceleration becomes higher than or equal to the first predetermined value, the electronic control unit stops execution of the control for reducing the output of the motor in accordance with the angular acceleration of the rotary body. This allows the rotational speed of the drive wheel before starting the control for reducing the output of the motor in accordance with the angular acceleration of the rotary body to approach the rotational speed before slipping or spinning of the drive wheel occurred.

In a twenty-seventh aspect of the bicycle controller according to any one of the preceding aspects, in accordance with a predetermined time, the electronic control unit is configured to stop execution of a control for reducing the output of the motor in accordance with the angular acceleration of the rotary body.

In accordance with the predetermined time, the electronic control unit stops execution of the control for reducing the output of the motor in accordance with the angular acceleration of the rotary body. This allows the reducing of the output of the motor, which is performed when the drive wheel slips or spins, to be stopped at a suitable timing.

In a twenty-eighth aspect of the bicycle controller according to any one of the preceding aspects, when a crank arm of the bicycle passes one of a top dead center and a bottom dead center, the electronic control unit is configured to stop execution of a control for reducing the output of the motor in accordance with the angular acceleration of the rotary body.

When the crank arm of the bicycle passes one of the top dead center and the bottom dead center, the electronic control unit stops execution of the control for reducing the output of the motor in accordance with the angular acceleration of the rotary body. Thus, when the drive wheel slips or spins, the output of the motor does not remain low over a period that is too long.

In a twenty-ninth aspect of the bicycle controller according to any one of the preceding aspects, when the human power becomes larger than or equal to a predetermined power, the electronic control unit is configured to stop execution of a control for reducing the output of the motor in accordance with the angular acceleration of the rotary body.

When the human power becomes larger than or equal to the predetermined power, the electronic control unit stops execution of the control for reducing the output of the motor in accordance with the angular acceleration of the rotary body. Thus, when the drive wheel slips or spins, the output of the motor does not remain low over a period that is too long.

A thirtieth aspect of the present invention is a bicycle controller is configured to control a drive unit configured to transmit rotation of a crank to a motor. The controller includes an electronic control unit is configured to control a load produced by the motor in accordance with an angular acceleration of a first rotary body included in a first power transmission path extending from an input for human power to a drive wheel or an angular acceleration of a second rotary body included in a second power transmission path extending from a motor, which is configured to assist in propulsion of the bicycle, to the drive wheel.

The electronic control unit controls the load produced by the output of the motor in accordance with the angular acceleration of the first rotation body or the second rotation body. This improves the stability of the behavior of the bicycle when the drive wheel slips or spins.

A thirty-first aspect of the present invention is a bicycle controller including an electronic control unit is configured to control a motor, which is configured to assist in propulsion of a bicycle, in accordance with human power. The electronic control unit is configured to increase a response speed of the motor with respect to a change in the human power upon determining a drive wheel of the bicycle is one of slipping or spinning and, at the same time, the human power decreases.

The electronic control unit increases the response speed of the motor with respect to a change in the human power when the drive wheel slips or spins and the human power decreases. This improves the stability of the behavior of the bicycle when the drive wheel slips or spins.

A thirty-first aspect of the present invention is a bicycle drive device including the bicycle controller according to any one of the preceding aspects and the motor.

The bicycle controller and the bicycle drive device according to the present invention improve the stability of the behavior of a bicycle.

DESCRIPTION OF THE EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 including a bicycle drive device of a first embodiment will now be described with reference to FIGS. 1 to 4.

Figure 1:
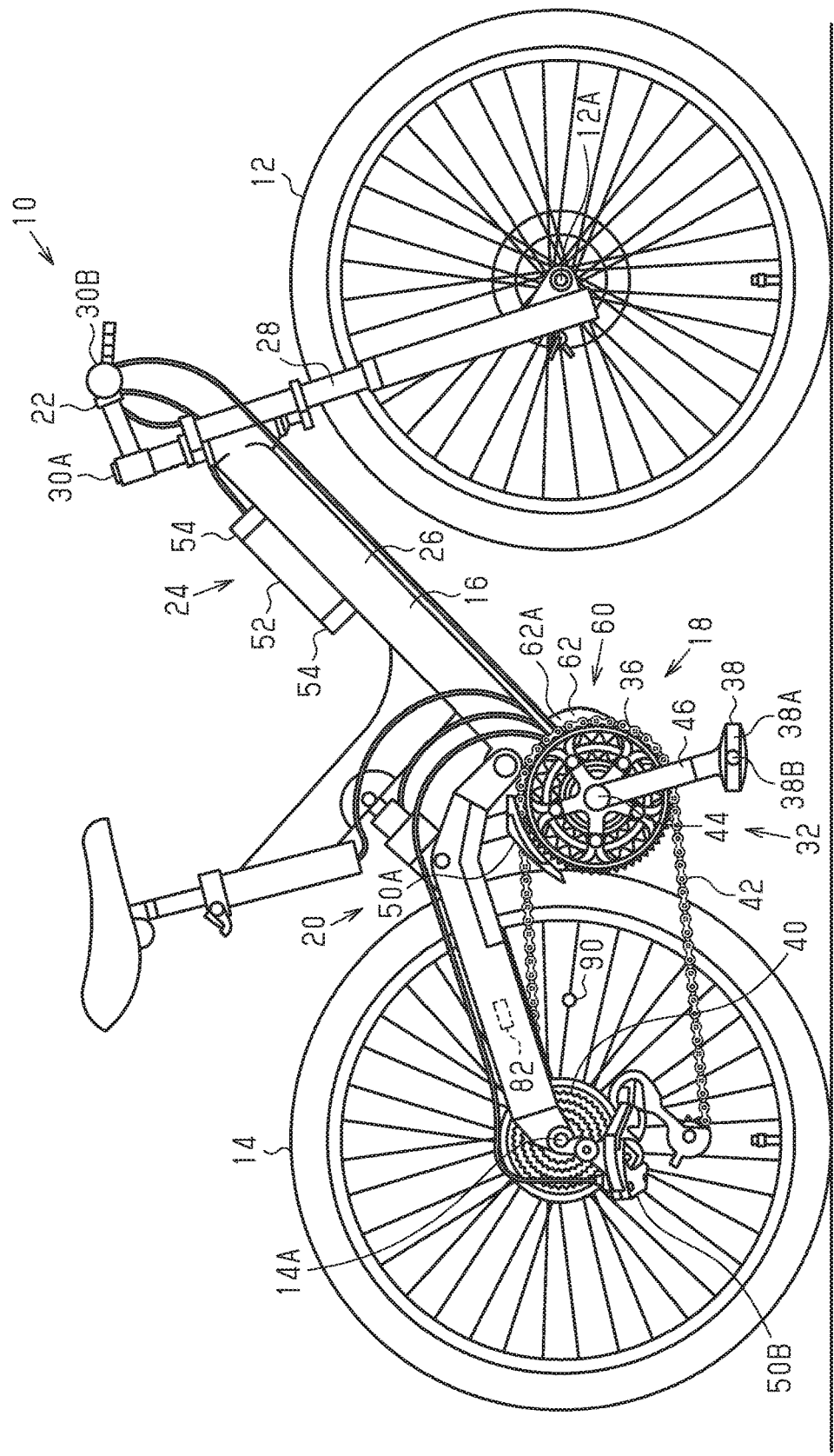
FIG. 1 is a side elevational view of a bicycle including a bicycle drive device in accordance with a first embodiment.

As shown in FIG. 1, the bicycle 10 includes a front wheel 12, a rear wheel 14, a bicycle body 16, a human power transmission path 18, an operation unit 22, a battery unit 24 and a bicycle drive device 60. In the first embodiment, the rear wheel 14 serves as a drive wheel. The bicycle body 16 includes a frame 26, a front fork 28 and a handlebar 30B. The front fork 28 is connected to the frame 26. The handlebar 30B is attached in a removable manner to the front fork 28 by a stem 30A. The front fork 28 is supported by the frame 26 and connected to an axle 12A of the front wheel 12. The bicycle 10 includes a brake device (not shown) and a brake actuator (not shown). The brake device applies braking force to the front wheel 12 and the rear wheel 14. The brake actuator controls the brake device.

Figure 2:
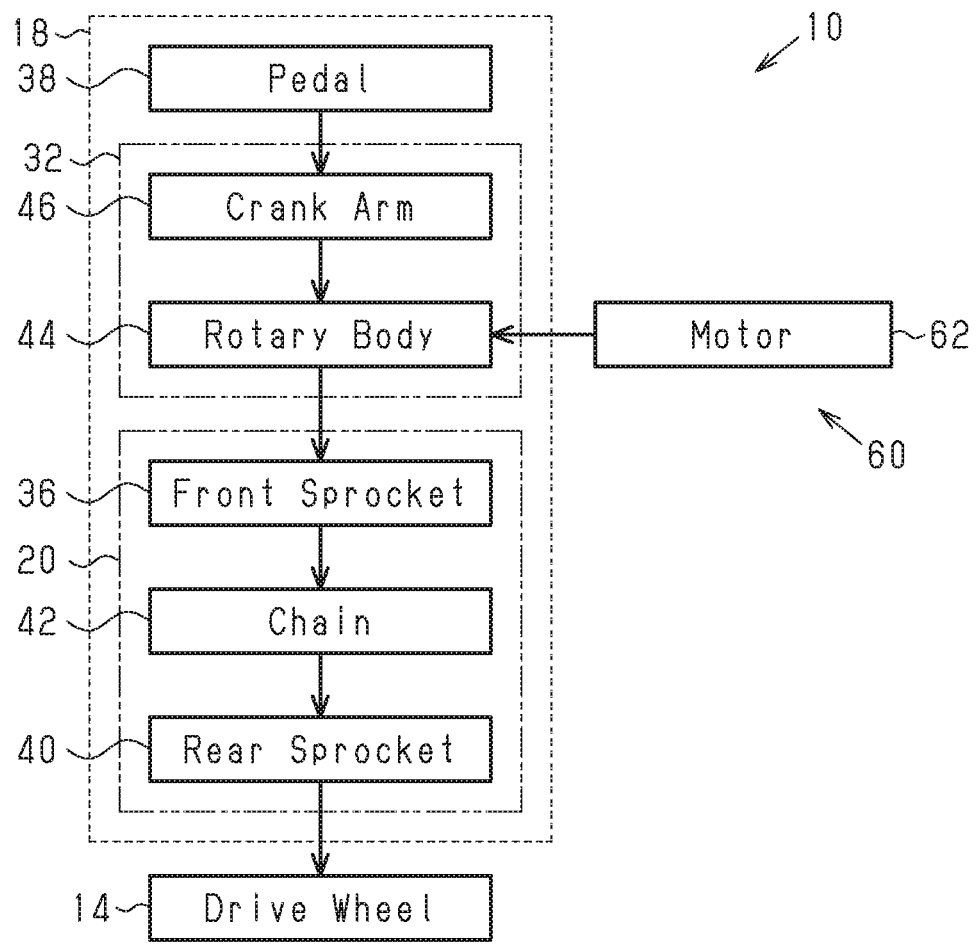
FIG. 2 is a schematic block diagram showing a human power transmission path of the bicycle in FIG. 1.

Referring to FIG. 2, the bicycle 10 is driven by human power transmitted to the rear wheel 14 through the human power transmission path 18. The human power transmission path 18 includes a gear change mechanism 20, a crank 32 and a pair of pedals 38. The gear change mechanism 20 includes a front sprocket 36, a rear sprocket 40 and a chain 42. The pedals 38 serve as an input for human power. The rear sprocket 40 serves as a coupling portion that is coupled to the rear wheel 14.

As shown in FIG. 1, the crank 32 includes a rotary body 44 and a pair of crank arms 46. A motor 62 is coupled to the frame 26. The rotary body 44 is rotatably supported by the frame 26 or a housing 62A of the motor 62. The rotary body 44 includes a crankshaft. The crank arms 46 are coupled to the rotary body 44. The pedals 38 each include a pedal body 38A and a pedal shaft 38B. The pedal shaft 38B of each of the pedals 38 is coupled to the corresponding one of the crank arms 46. The pedal body 38A is supported by the corresponding pedal shaft 38B in a manner rotatable to the pedal shaft 38B.

The front sprocket 36 is coupled to the rotary body 44. The front sprocket 36 is coaxial with the rotary body 44. The front sprocket 36 can be coupled to the rotary body 44 so as to be non-rotatable relative to the rotary body 44. Alternatively, the front sprocket 36 can be coupled by a one-way clutch (not shown) to the rotary body 44 so that when the rotary body 44 rotates in the forward direction, the front sprocket 36 also rotates in the forward direction. The front sprocket 36 can include one or more sprockets.

The rear sprocket 40 is coupled to the rear wheel 14 so as to be rotatable about an axle 14A of the rear wheel 14. The rear sprocket 40 is coupled to the rear wheel 14 that includes a hub (not shown). The hub includes a hub shell, a drive body that holds the rear sprocket 40, and a one-way clutch arranged between the hub shell and the drive body. The chain 42 runs around the front sprocket 36 and the rear sprocket 40. When the crank 32 is rotated in one direction by human power applied to the pedals 38, the front sprocket 36, the chain 42 and the rear sprocket 40 also rotate the rear wheel 14 in the same direction. When the crank 32 and the rear wheel 14 are both rotated in this direction, the bicycle 10 moves forward.

The gear change mechanism 20 further includes a gear changer 50. The transmission 50 includes a first transmission 50A and a second transmission 50B. The front sprocket 36 and the rear sprocket 40 each include multiple sprockets. However, the front sprocket 36 can include only one sprocket, and the rear sprocket can include multiple sprockets. Alternatively, the front sprocket 36 can include multiple sprockets, and the rear sprocket 40 can include only one sprocket. When one of the front sprocket 36 and the rear sprocket 40 includes only one sprocket, one of the first transmission 50A and the second transmission 50B can be omitted. The first gear changer 50A is an external gear changer that is located near the front sprocket 36. The first gear changer 50A shifts the chain 42 from one sprocket to another sprocket. The first transmission 50A is a front derailleur. The second transmission 50B is an external transmission that is located near the rear sprocket 40. The second transmission 50B shifts the chain 42 from one sprocket to another sprocket. The second transmission 50B is a rear derailleur. The rotary body 44 is located at an upstream side of the gear change mechanism 20 in the human power transmission path 18. The first transmission 50A and the second transmission 50B each include an actuator 48. The gear change mechanism 20 shifts the chain from one sprocket to another sprocket on the front sprocket 36 and the rear sprocket 40 to change the ratio of the rotational speed of the rear wheel 14 to the rotational speed of the crank 32 (hereafter, referred to as "the gear ratio r") in the bicycle 10.

The operation unit 22 shown in FIG. 2 is coupled to the handlebar 30B. The operation unit 22 is electrically connected to a controller 70 by a cable (not shown). Here, the controller 70 includes an electronic control unit 72 that is electrically connected to operation unit 22 by the cable (not shown). When operated by the rider, the operation unit 22 transmits a shift-up signal or a shift-down signal to the electronic control unit 72. The shift-up signal increases the gear ratio r1 of the bicycle, and the shift-down signal decreases the gear ratio r1 of the bicycle. A shift-up refers to a gear change that increases the gear ratio r, and a shift-down refers to a gear change that decreases the gear ratio r. The operation unit 22 and the electronic control unit 72 can be connected to each other in a manner enabling wireless communication. The operation unit 22 can include two operation units to separately operate the first transmission 50A and the second transmission 50B. Alternatively, the operation unit 22 can include only one operation unit so that the first transmission 50A and the second transmission 50B cooperate to change gears in accordance with predetermined shift routes. The shift routes include a first route that increases the gear ratio r of the bicycle 10 in steps and a second route that decreases the gear ratio r of the bicycle 10 in steps. The gear ratio r is set by the operation of the first transmission 50A and the second transmission 50B. When the electronic control unit 72 receives a shift-up signal, the electronic control unit 72 controls at least one of the first transmission 50A and the second transmission 50B in accordance with the first route. When the electronic control unit 72 receives a shift-down signal, the electronic control unit 72 controls at least one of the first transmission 50A and the second transmission 50B in accordance with the second route.

The battery unit 24 includes a battery 52 and a battery holder 54, which is used to couple the battery 52 to the frame 26 in a removable manner. The battery 52 includes one or more battery cells. The battery 52 is rechargeable and electrically connected to the motor 62 of the bicycle drive device 60 to supply the motor 62 with power.

Figure 3:
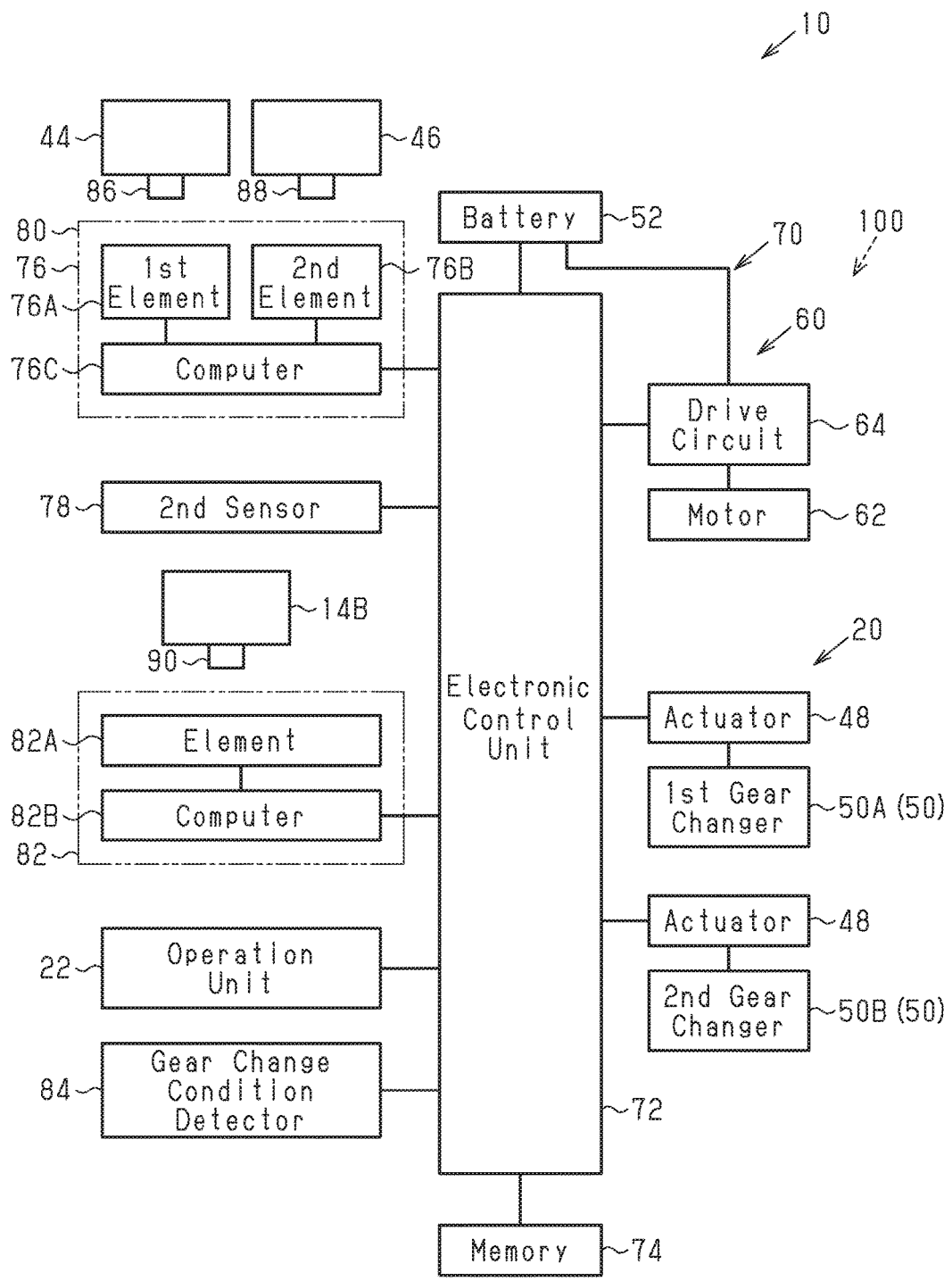
FIG. 3 is a block diagram of a bicycle controller for the bicycle of FIG. 1.

As shown in FIG. 3, the bicycle drive device 60 includes a bicycle controller 70 (hereafter, simply referred to as "the controller 70"). In one example, the bicycle drive device 60 further includes a drive circuit 64 for the motor 62. The controller 70 is electrically connected to the battery 52 and supplied with power from the battery 52.

The motor 62 shown in FIG. 2 is configured to provide assistance to human power. The motor 62 is configured to assist in the propulsion of the bicycle 10. The motor 62 is arranged in a housing 62A, which is supported by the frame 26 shown in FIG. 1. The motor 62 of FIG. 2 is an electric motor. The motor 62 is coupled to the rotary body 44. Preferably, a power transmission path between the motor 62 and the rotary body 44 includes a one-way clutch so that the rotational force of the rotary body 44 when rotating the crank 32 forward does not rotate an output shaft of the motor 62. In a further example, the motor 62 is coupled to the chain 42 or the rear wheel 14. The motor 62 is configured to be capable of performing a regenerative operation. When the rear wheel 14 slips or spins, the electronic control unit 72 of the controller 70 reduces the output TM of the motor 62. Here, the term "slips" refers to the wheel rotating relative to a riding surface of a bicycle in which a tire of the wheel remains in contact with the riding surface. Here, the term "spins" refers to the wheel rotating relative to a riding surface of a bicycle in which the wheel momentarily loses contact with the riding surface.

In addition to the controller 70 including the electronic control unit 72, in the first embodiment, the controller 70 further includes a memory 74, a first sensor 76, a second sensor 78, a third sensor 80, a fourth sensor 82 and a gear change condition detector 84.

Referring to FIG. 3, the first sensor 76 is configured to output a signal corresponding to the rotational speed of the rotary body 44 (hereafter, referred to as "the rotational speed CA"). The rotational speed CA is the rotational speed of the crank 32. The first sensor 76 is also configured to output a signal corresponding to a rotational position of the rotary body 44. The first sensor 76 is coupled to the frame 26. The first sensor 76 includes a first element 76A, which detects the magnetic field of a first magnet 86, and a second element 76B, which detects the magnetic field of a second magnet 88. The first magnet 86 is an annular magnet that includes magnetic poles that are alternately arranged in the circumferential direction. The first magnet 86 is coupled to the rotary body 44 or the crank arm 46, and is arranged coaxially with the rotary body 44. The second magnet 88 is coupled to the rotary body 44, and is coupled to one of the left and right crank arms 46.

The first sensor 76 is electrically connected to the electronic control unit 72 by a cable. The first sensor 76 includes the first element 76A, the second element 76B and a computer 76C. The computer 76C is a central processing unit (CPU) or a micro-processing unit (MPU), which includes a processor and memory. The first sensor 76 is configured to provide the electronic control unit 72 with a signal corresponding to the rotational speed of the rotary body 44 and a signal corresponding to the rotational angle of the rotary body 44. The first sensor 76 functions as a cadence sensor. The first element 76A is configured to output a signal corresponding to a change in the magnetic field of the first magnet 86. The first element 76A is configured to detect an angular position of the crank 32 relative to the frame 26 or the housing 62A of the motor 62. When the crank 32 completes a single rotation, the first element 76A is configured to output a signal in which a single cycle corresponds to an angle obtained by dividing 360° by the number of poles having the same polarity. The second element 76B is configured to detect the magnetic field of the second magnet 88. The second element 76B is configured to detect a reference angular position of the crank 32 relative to the frame 26 or the housing 62A of the motor 62. The second element 76B is configured to output a signal in which a single cycle corresponds to a single rotation of the crankshaft.

The computer 76C is configured to compute the rotational speed RA of the rotary body 44 from the output of at least one of the first element 76A and the second element 76B. The computer 76C is configured to transmit to the electronic control unit 72 information indicating the rotational speed RA of the rotary body 44 and information indicating the rotational phase of the rotary body 44. The first sensor 76 is shared with the third sensor 80, which is configured to output a signal corresponding to the phase of the crank 32. The minimum angle of the crank 32 that is detectable by the first sensor 76 is 180 degrees or less, preferably, 15 degrees, and more preferably, 6 degrees. The computer 76C can be included in the electronic control unit 72. The first sensor 76 can be separate from the third sensor 80. The first sensor 76 can include only one of the first element 76A and the second element 76B. When the first sensor 76 only includes the first element 76A, the third sensor 80 is separate from the first sensor 76 and includes an element similar to the second element 76B.

The second sensor 78 is configured to output a signal corresponding to the human power T. The second sensor 78 is configured to detect the human power T applied to the crank 32 (refer to FIG. 1). Referring to FIG. 2, the second sensor 78 can be arranged between the rotary body 44 and the front sprocket 36, on the rotary body 44 or the front sprocket 36, or on one of the crank arms 46 or one of the pedals 38. The second sensor 78 can be, for example, a strain sensor, a magnetostrictive sensor, an optical sensor, or a pressure sensor. Any sensor can be used as the second sensor 78 as long as it outputs a signal corresponding to the human power applied to the crank arm 46 or the pedal 38.

The fourth sensor 82 is configured to detect the rotational speed of the rear wheel 14 (refer to FIG. 1). The fourth sensor 82 is fixed to the frame 26 by a band or by a nut and bolt. The fourth sensor 82 is electrically connected to the electronic control unit 72 by a cable. The fourth sensor 82 includes an element 82A and a computer 82B. The element 82A is configured to detect the magnetic field of a magnet 90 coupled to a spoke 14B of the rear wheel 14. The fourth sensor 82 is a vehicle speed sensor. The element 82A is configured to output a signal in which a single cycle is a single rotation of the rear wheel 14 (refer to FIG. 1). The computer 82B is configured to compute the rotational speed RA of the rear wheel 14 from the output of the element 82A, and is configured to output the rotational speed RA to the electronic control unit 72. Instead of the magnet 90, an annular magnet such as the first magnet 86 that has poles alternately arranged in the circumferential direction can be coupled to the hub and detected by the fourth sensor 82. This allows the rotational speed of the rear wheel 14 to be detected with further accuracy.

The gear change condition detector 84 is electrically connected to the electronic control unit 72 by a cable. The gear change condition detector 84 is configured to detect the present gear change condition of the gear change mechanism 20. The gear change condition detector 84 is configured to output information related to the gear position of the transmissions 50A and 50B, namely, the gear ratio r. The gear change condition detector 84 is configured to detect the movement amount of the transmissions 50A and 50B or the rotational angles of the transmissions 50A and 50B at predetermined positions. The gear change condition detector 84 can be formed by a detector such as a potentiometer or a magnet and a magnetic sensor that detects the magnet.

The electronic control unit 72 includes a computer that executes a predetermined control program. The computer includes, for example, a central processing unit (CPU) or a micro-processing unit (MPU). The memory 74 stores information used for various control programs and various control processes. The memory 74 stores the outputs of the first sensor 76, the second sensor 78, the third sensor 80, the fourth sensor 82 and the gear change condition detector 84.

The electronic control unit 72 is configured (e.g., programmed) to control the motor 62 and the gear change mechanism 20. The electronic control unit 72 is configured to control the motor 62 in accordance with the signal output from the second sensor 78. Further, the electronic control unit 72 is configured to control the motor 62 in accordance with the human power T stored in the memory 74. The electronic control unit 72 is configured to control the drive circuit 64 and supplies the motor 62 with power in accordance with a map or mathematical expression indicating the relationship of the human power T stored in the memory 74 and the output TM of the motor 62. The drive circuit 64 includes an inverter circuit. The electronic control unit 72 is configured to control the gear change mechanism 20 in accordance with gear change signal from the operation unit 22. When receiving a shift-up signal from the operation unit 22, the electronic control unit 72 is configured to increase the gear ratio r by supplying power to the actuator 48 of at least one of the first transmission 50A and the second transmission 50B and operating the transmission 50. When receiving a shift-down signal from the operation unit 22, the electronic control unit 72 is configured to decrease the gear ratio r by supplying power to the actuator 48 of at least one of the first transmission 50A and the second transmission 50B and operating the transmission 50.

The electronic control unit 72 is configured to compute an estimated value RX of the rotational speed RA of the rear wheel 14 from the rotational speed RA of the rotary body 44. The electronic control unit 72 is configured to multiply the rotational speed CA of the rotary body 44 by the present gear ratio r to compute the estimated value RX.

The electronic control unit 72 is configured to compute the angular acceleration DC of the rotary body 44. The angular acceleration DC is the acceleration of the rotary body 44 when rotated forward. Forward rotation of the rotary body 44 corresponds to the rotational direction of the rotary body 44 when the bicycle 10 moves forward. The electronic control unit 72 can, for example, differentiate the rotational speed CA of the rotary body 44 to calculate the angular acceleration DC. Alternatively, the electronic control unit 72 can, for example, calculate the amount of change in the rotational speed CA of the rotary body 44 during a predetermined time as the angular acceleration DC.

The electronic control unit 72 is configured to compute the angular acceleration DR of the rear wheel 14. Forward rotation of the rear wheel 14 corresponds to the rotational direction of the rear wheel 14 when the bicycle 10 moves forward. The electronic control unit 72 can, for example, differentiate the rotational speed RA of the rear wheel 14 to calculate the angular acceleration DR or calculate the amount that the rotational speed RA of the rear wheel 14 changes during a predetermined time as the angular acceleration DR.

The electronic control unit 72 is configured to control the motor 62 in accordance with the signal output from the first sensor 76. In one example, the electronic control unit 72 detects spinning and slipping of the rear wheel 14 from the output of the third sensor 80, and executes a first control to decrease the output TM of the motor 62. More specifically, the electronic control unit 72 detects spinning and/or slipping of the rear wheel 14 from the angular acceleration DC, a decrease amount DT of the human power T, and the angular acceleration DR and reduces the output TM of the motor 62.

In the first control, the electronic control unit 72 is configured to reduce the output TM of the motor 62 when the angular deceleration DC is higher than or equal to a first predetermined value DCX and, at the same time, the decrease amount DT of the human power T per unit time is larger than or equal to a second predetermined value DTX. When the electronic control unit 72 reduces the output TM of the motor 62 in accordance with the angular acceleration DC of the rotary body 44, the electronic control unit 72 is configured to control the motor 62 in accordance with the rotational speed RA of the rear wheel 14 and the rotational speed CA of the crank 32. When the gear change mechanism 20 is not functioning to decrease the gear ratio r of the bicycle 10, the electronic control unit 72 is configured to reduce the output TM of the motor 62 in accordance with the angular acceleration DC of the rotary body 44.

In accordance with the rotational speed of the rear wheel 14, the electronic control unit 72 is configured to stop executing the control that reduces the output TM of the motor 62 in accordance with the angular acceleration DC of the rotary body 44. Further, in accordance with the rotational speed CA of the rotary body 44 before the angular acceleration DC becomes higher than or equal to the first predetermined value DCX, the electronic control unit 72 is configured to stop executing the control that reduces the output TM of the motor 62 in accordance with the angular acceleration DC of the rotary body 44.

The first control executed by the electronic control unit 72 will now be described with reference to FIG. 4. This routine is repeated in predetermined cycles as long as the controller 70 is activated.

In step S11, the electronic control unit 72 determines whether or not the decrease amount DT of the human power T is higher than or equal to the second predetermined value DTX. When determining that the decrease amount DT of the human power T is higher than or equal to the second predetermined value DTX, that is, when determining that the human power T has suddenly decreased, the electronic control unit 72 proceeds to step S12. When the decrease amount DT of the human power T is lower than the second predetermined value DTX, the electronic control unit 72 performs step S11 again after a predetermined cycle. The second predetermined value DTX is, for example, minus 15 newton meters/50 milliseconds. The second predetermined value DTX can be changed by connecting an external computer to the controller 70.

In step S12, the electronic control unit 72 determines whether or not the angular acceleration DC of the rotary body 44 is higher than or equal to the first predetermined value DCX. Upon determining that the angular acceleration CA of the rotary body 44 is higher than or equal to the first predetermined value DCX, that is, upon determining that the rotational speed CA of the rotary body 44 has suddenly increased, the electronic control unit 72 proceeds to step S13. When the angular acceleration DC of the rotary body 44 is lower than the first predetermined value DCX, the electronic control unit 72 performs step S11 again after a predetermined cycle. The first predetermined value DCX is, for example, 30 rotations/50 milliseconds. The first predetermined value DCX can be changed by connecting an external computer to the controller 70.

In step S13, the electronic control unit 72 determines whether or not the angular acceleration DR of the rear wheel 14 is higher than or equal to a fourth predetermined value DRX. Upon determining that the angular acceleration DR of the rear wheel 14 is higher than or equal to the fourth predetermined value DRX, that is, upon determining that the rotational speed RA of the rear wheel 14 has suddenly increased, the electronic control unit 72 proceeds to step S14. When the angular acceleration DR of the rear wheel 14 is lower than the fourth predetermined value DRX, the electronic control unit 72 performs step S11 again after a predetermined cycle. The fourth predetermined value DRX is, for example, a value corresponding to a 200 percent increase of the rotational speed RA of the rear wheel 14 in 50 milliseconds. The fourth predetermined value DRX can be changed by connecting an external computer to the controller 70.

In step S14, the electronic control unit 72 determines whether or not the gear ratio r is being decreased. When a shift-down operation is performed, as long as conditions such as the riding load are the same, the human power T decreases and the rotational speed CA of the rotary body 44 increases. Thus, in step S14, the electronic control unit 72 determines whether or not the determination results of steps S11 and S12 were obtained because of an operation that decreases the gear ratio R. Upon determining that the gear ratio r is not decreasing, the electronic control unit 72 proceeds to step S15. Upon determining that the gear ratio r is decreasing, the electronic control unit 72 performs step S11 again after a predetermined cycle.

In step S15, the electronic control unit 72 determines whether or not the estimated value RX is lower than the rotational speed RA of the rear wheel 14. When the gear ratio r is not being decreased and the rear wheel 14 is in contact with the road surface, the estimated value RX and the rotational speed RA are substantially the same. When the gear ratio r is not being decreased and the rear wheel 14 is not in contact with the road surface, the estimated value RX is lower than the rotational speed RA. Thus, the electronic control unit 72 determines whether or not the estimated value RX is lower than the rotational speed RA of the rear wheel 14 to determine whether the rear wheel 14 is slipping in contact with the road surface (riding surface) or spinning without contacting the road surface (riding surface).

When the estimated value RX is lower than the rotational speed RA of the rear wheel 14, the electronic control unit 72 proceeds to step S16 and determines that the rear wheel 14 of the bicycle 10 is spinning. Then, the electronic control unit proceeds to step S17. In step S17, the electronic control unit 72 obtains the rotational speed RA of the rear wheel 14 taken immediately before the spinning determination from the memory 74 and sets the rotational speed RA as a target value RY. Then, the electronic control unit 72 proceeds to step S18. The rotational speed RA selected as the target value RY is, for example, the one obtained a predetermined time before the angular acceleration DC of the rotary body 44 reached the first predetermined value DCX. The predetermined time is, for example, 0.1 to 1 second. The target value RY can be the average value of the rotational speed RA of the rear wheel 14 obtained a predetermined time before the angular acceleration DC of the rotary body 44 reached the first predetermined value DCX. The average value of the rotational speed RA of the rear wheel 14 is the average value for a predetermined time. The predetermined time is, for example, 1 to 5 seconds.

In step S18, the electronic control unit 72 executes a rotational speed control on the motor 62 and proceeds to step S19. In step S18, the electronic control unit 72 reduces the output TM of the motor 62 or stops driving the motor 62.

In step S19, the electronic control unit 72 determines whether or not the estimated value RX has become lower than or equal to the target value RY. When the estimated value RX is higher than the target value RY, the electronic control unit 72 returns to step S18. When the estimated value RX has become lower than or equal to the target value RY, the electronic control unit 72 proceeds to step S20. In step S20, the electronic control unit 72 ends the rotational speed control of the motor 62 and ends the present routine. The electronic control unit 72 performs steps S18 to S20 to continue the rotational speed control of the motor 62 until the estimated value RX becomes equal to the target value RY.

When the estimated value RX is higher than or equal to the rotational speed RA of the rear wheel 14 in step S15, the electronic control unit 72 proceeds to step S21 and determines that the rear wheel 14 of the bicycle 10 is slipping. In step S22, the electronic control unit 72 obtains the rotational speed RA of the rear wheel 14 taken immediately before the slipping determination from the memory 74 and sets the rotational speed RA as the target value RY. Then, the electronic control unit 72 proceeds to step S23. In step S23, the electronic control unit 72 executes a rotational speed control for slipping on the motor 62 and proceeds to step S24. In step S23, the electronic control unit 72 reduces the output TM of the motor 62 or stops driving the motor 62.

Preferably, the electronic control unit 72 is configured to reduce the output TM of the motor 62 more greatly when the rotational speed RA of the rear wheel 14 is higher than the estimated value RX of the rotational speed RA of the rear wheel 14 calculated from the rotational speed CA of the rotary body 44 and the gear ratio r of the bicycle 10 than when the rotational speed RA of the rear wheel 14 is lower than or equal to the estimated value RX. Thus, under conditions that are the same except for the comparison result of the rotational speed RA of the rear wheel 14 and estimated value RX, the output TM of the motor 62 in step S23 is larger than the output TM of the motor 62 in step S18.

In step S24, the electronic control unit 72 determines whether or not the estimated value RX has become lower than or equal to the target value RY. When the estimated value LX is higher than the target value RY, the electronic control unit 72 returns to step S23. When the estimated value RX becomes lower than or equal to the target value RY in step S24, the electronic control unit 72 proceeds to step S20. In step S20, the electronic control unit 72 ends the rotational speed control of the motor 62 executed in step S23 and ends the present routine. The electronic control unit 72 performs steps S22, S23, and S20 to continue the rotational speed control of the motor 62 until the estimated value RX becomes equal to the target value RY.

The bicycle drive device 60 has the advantages described below.

The electronic control unit 72 is configured to reduce the output TM of the motor 62 in accordance with the angular velocity DC of the rotary body 44. The output TM of the motor 62 is lowered when the rear wheel 14 slips or spins. This improves the stability of the behavior of the bicycle 10.

When the electronic control unit 72 reduces the output TM of the motor 62 in the first control, the electronic control unit 72 has the motor 62 perform a braking operation. Thus, when the rear wheel 14 slips or spins, the rotational speed RA of the rear wheel 14 is quickly decreased to a suitable speed.

The electronic control unit 72 is configured to reduce the output TM of the motor 62 in accordance with the output of the second sensor 78. This improves the detection accuracy of slipping or spinning of the rear wheel 14 as compared to when detecting slipping or spinning of the rear wheel 14 from only the angular acceleration DC of the rotary body 44.

When the electronic control unit 72 reduces the output TM of the motor 62 in accordance with the angular acceleration DC of the rotary body 44, the electronic control unit 72 is configured to control the motor 62 in accordance with the rotational speed RA of the rear wheel 14 and the rotational speed RA of the crank 32. The rotational speed RA of the rear wheel 14 and the rotational speed RA of the crank 32 are compared to determine whether or not the rear wheel 14 is spinning or slipping. This allows the output TM of the motor 62 to be controlled in a manner suitable for spinning and slipping of the rear wheel 14.

When the rear wheel 14 is spinning, the rear wheel 14 can be separated from the road surface. Thus, a higher rotational speed RA of the rear wheel 14 may result in unstable behavior of the bicycle 10 when the rear wheel 14 comes into contact with the road surface. When the rotational speed RA of the rear wheel 14 is higher than the estimated value RX, the electronic control unit 72 is configured to reduce the output TM of the motor 62 by a greater amount than when the rotational speed RA of the rear wheel 14 is lower than or equal to the estimated value RX. This stabilizes the behavior of the bicycle 10 when the rear wheel 14 spins.

When the gear ratio r is being decreased, the electronic control unit 72 does not lower the output TM of the motor 62 in accordance with the angular acceleration DC of the rotary body 44. This reduces erroneous detection of slipping or spinning of the rear wheel 14 when the gear ratio r is being decreased to increase the rotational speed RA of the rear wheel 14.

Second Embodiment

Figure 5:
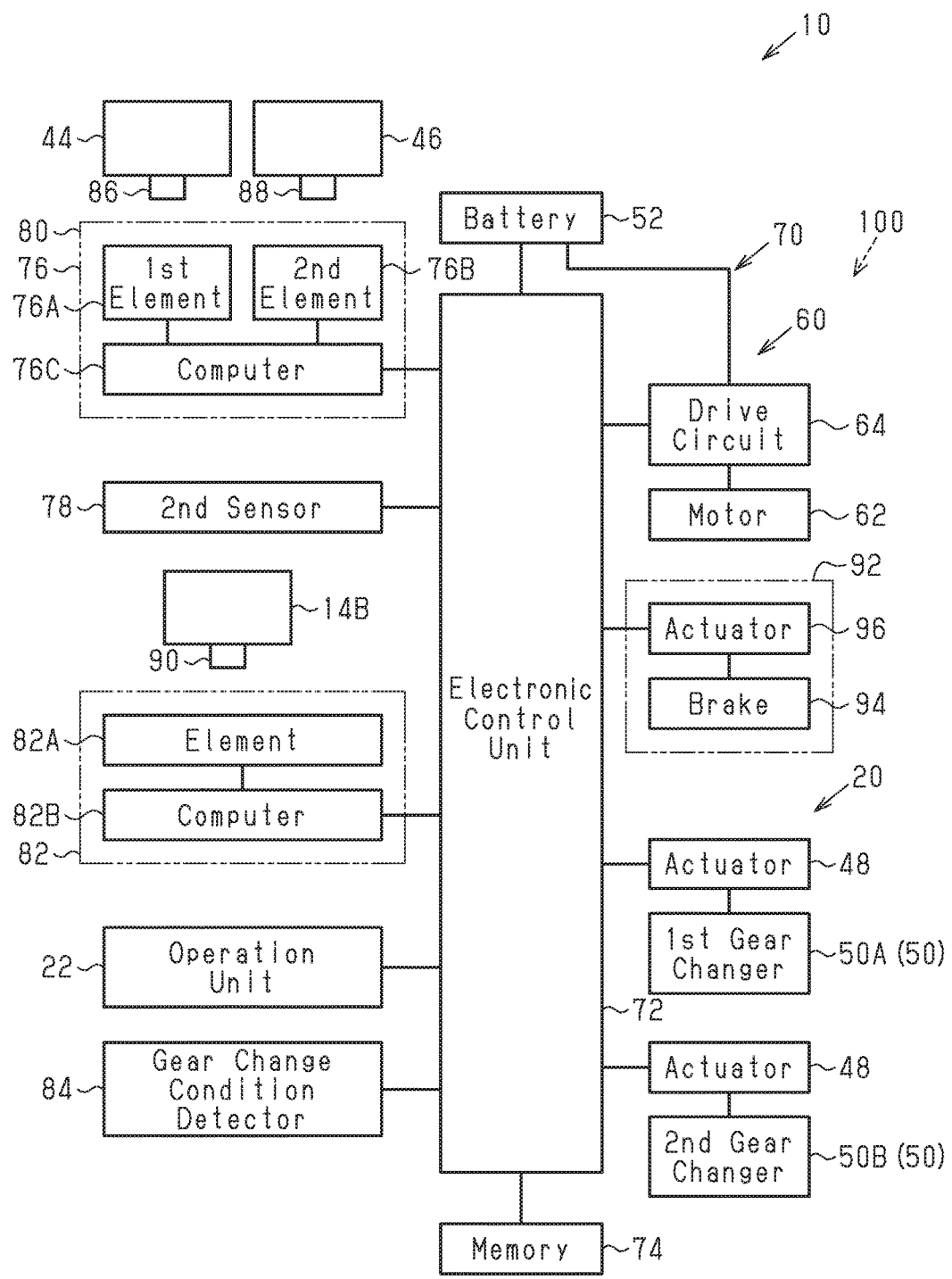
FIG. 5 is a block diagram of a bicycle controller in accordance with a second embodiment.
Figure 6:
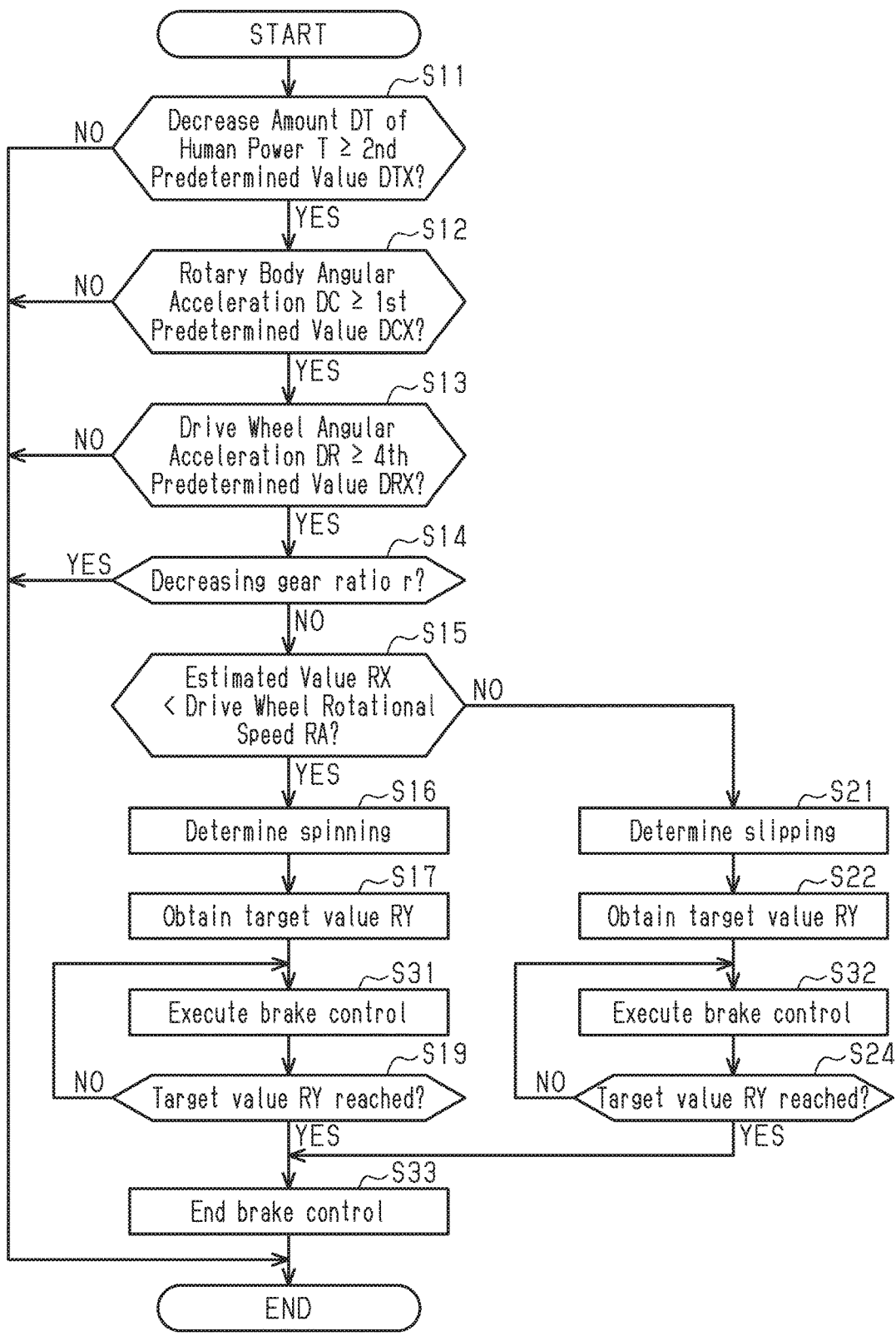
FIG. 6 is a flowchart of a second control executed by the electronic control unit accordance with in the second embodiment.

With reference to FIGS. 5 and 6, the bicycle drive device 60 of a second embodiment will now be described. Same reference characters are given to those components that are the same as the corresponding components of the first embodiment. Such components will not be described in detail. The bicycle drive device 60 of the second embodiment has the same structure as the bicycle drive device 60 of the first embodiment but differs in the control executed by the electronic control unit 72.

As shown in FIG. 5, the bicycle 10 includes a brake device 92 that applies the brake to the rear wheel 14. The brake device 92 includes a brake mechanism 94 and an actuator 96. The brake mechanism 94 can be a rim brake mechanism or a disc brake mechanism. The actuator 96 can be, for example, an electric motor or a solenoid.

Referring to FIG. 6, a second control that is executed by the electronic control unit 72 will now be described.

The electronic control unit 72 applies the brake to the rear wheel 14 with the brake device 92 when reducing the output TM of the motor 62 in accordance with the angular acceleration DC of the rotary body 44. In the second control, the electronic control unit 72 executes step S31 instead of step S18 of the first control in the first embodiment, step S32 instead of step S23, and step S33 instead of step S20.

In step S31, the electronic control unit 72 executes a brake control and then proceeds to step S19. The electronic control unit 72 operates the brake mechanism 94 in step S31 and decreases the rotational speed of the rear wheel 14. When the electronic control unit 72 determines in step S19 that the estimated value RX has become equal to the target value RY, the electronic control unit 72 proceeds to step S33 and ends the brake control.

The electronic control unit 72 executes the brake control in step S32 and proceeds to step S24. The electronic control unit 72 operates the brake mechanism 94 in step S32 and decreases the rotational speed of the rear wheel 14. When the electronic control unit 72 determines in step S24 that the estimated value RX has reached the target value RY, the electronic control unit 72 proceeds to step S33 and ends the brake control.

The electronic control unit 72 increases the braking force of the brake mechanism 94 more greatly when the rotational speed RA of the rear wheel 14 is higher than the estimated value RX of the rotational speed RA of the rear wheel 14 calculated from the rotational speed CA of the rotary body 44 and the gear ratio r of the bicycle 10 than when the rotational speed RA of the rear wheel is lower than or equal to the estimated value RX.

In addition to the advantages of the first embodiment, the bicycle drive device 60 of the second embodiment has the advantage described below.

The rotational speed of the rear wheel 14 is controlled with the brake mechanism 94. Thus, the rotational speed RA of the rear wheel 14 reaches the target value RY within a shorter time than when controlling the rotational speed of the rear wheel 14 with only the motor 62.

Third Embodiment

Figure 7:
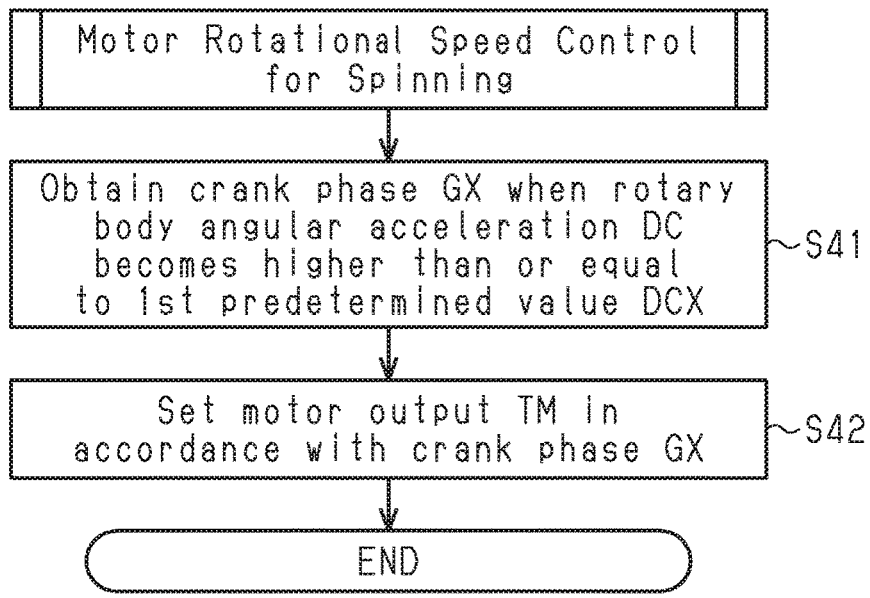
FIG. 7 is a flowchart of a sub-routine of a motor rotational speed control executed when spinning occurs by the electronic control unit in accordance with a third embodiment.
Figure 8:
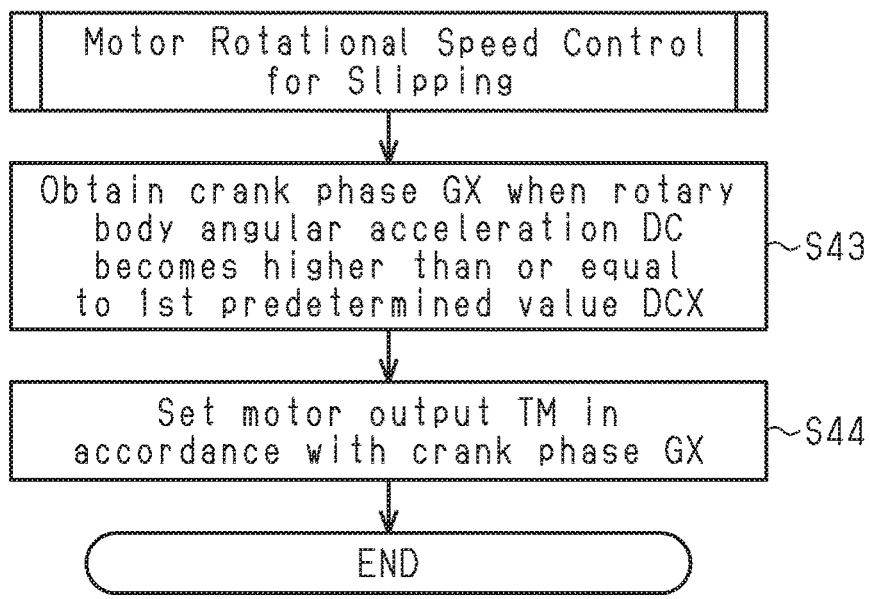
FIG. 8 is a flowchart of a sub-routine of a motor rotational speed control executed when slipping occurs by the electronic control unit in accordance with the third embodiment.

With reference to FIGS. 7 and 8, the bicycle drive device 60 of a third embodiment will now be described. Same reference characters are given to those components that are the same as the corresponding components of the first embodiment. Such components will not be described in detail. The bicycle drive device 60 of the third embodiment has the same structure as the bicycle drive device 60 of the first embodiment but differs in the control executed by the electronic control unit 72.

The electronic control unit 72 is configured to reduce the output TM of the motor 62 in accordance with the phase of the crank 32. The electronic control unit 72 is configured to control the motor 62 in accordance with a signal output from the third sensor 80. The electronic control unit 72 is configured to reduce the output TM of the motor 62 in accordance with the phase of the crank 32 upon determining the angular acceleration DC has become higher than or equal to the first predetermined value DCX. When reducing the output TM of the motor 62 in accordance with the angular acceleration DC of the rotary body 44, the electronic control unit 72 is configured to control the motor 62 to lower the output TM of the motor 62 more greatly when the phase of the crank 32 corresponds to a middle position between the top dead center and the bottom dead center than when the phase of the crank 32 corresponds to one of the top dead center and the bottom dead center.

Figure 4:
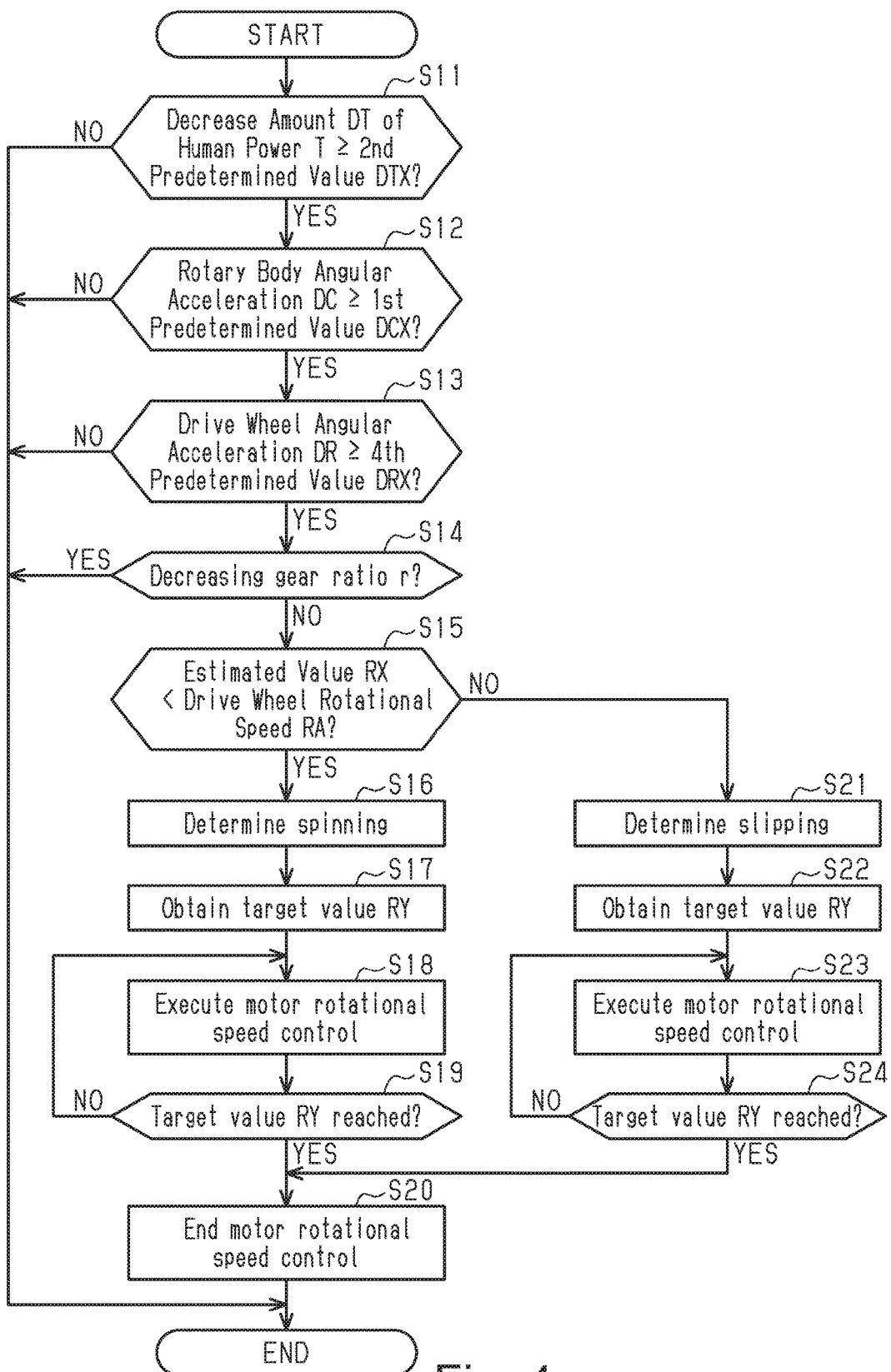
FIG. 4 is a flowchart of a first control executed by an electronic control unit of the bicycle controller shown in FIG. 3.

The electronic control unit 72 executes the process shown in FIG. 7 in step S18 of FIG. 4. In step S41, the electronic control unit 72 obtains the phase GX of the crank 32 upon determining the angular acceleration DC has become higher than or equal to the first predetermined value DCX and then proceeds to step S42. In step S42, the electronic control unit 72 sets the output TM of the motor 62 in accordance with the phase GX of the crank 32. More specifically, the electronic control unit 72 sets the output TM of the motor 62 so that the output TM of the motor 62 is lowered more greatly when the phase of the crank 32 corresponds to a middle position between the top dead center and the bottom dead center than when the phase of the crank 32 corresponds to the top dead center or the bottom dead center. The electronic control unit 72 reduces the output TM of the motor 62 in accordance with the output TM of the motor 62 set in step S42.

The electronic control unit 72 executes the process shown in FIG. 8 in step S23 of FIG. 4. In step S43, the electronic control unit 72 obtains the phase GX of the crank 32 when the angular acceleration DC becomes higher than or equal to the first predetermined value DCX and then proceeds to step S44. In step S44, the electronic control unit 72 sets the output TM of the motor 62 in accordance with the phase GX of the crank 32. More specifically, the electronic control unit 72 sets the output TM of the motor 62 so that the output TM of the motor 62 is lowered more greatly when the phase of the crank 32 corresponds to a middle position between the top dead center and the bottom dead center than when the phase of the crank 32 corresponds to the top dead center or the bottom dead center. The electronic control unit 72 is configured to reduce the output TM of the motor 62 in accordance with the output TM of the motor 62 set in step S44.

In addition to the advantages of the first embodiment, the bicycle drive device 60 of the third embodiment has the advantage described below.

The human power T increases when the crank 32 is located at a middle position between the top dead center and the bottom dead center. This increases the output of the motor 62 that produces assist force in accordance with the human power T. When the electronic control unit 72 reduces the output TM of the motor 62 in accordance with the angular acceleration of the rotary body 44, the electronic control unit 72 reduces the output TM of the motor 62 more greatly when the phase of the crank 32 corresponds to a middle position between the top dead center and the bottom dead center than when the phase of the crank 32 corresponds to the top dead center or the bottom dead center. Thus, when the output TM of the motor 62 is large before reducing the output, the output TM of the motor 62 can be lowered in a suitable manner.

Fourth Embodiment

Figure 9:
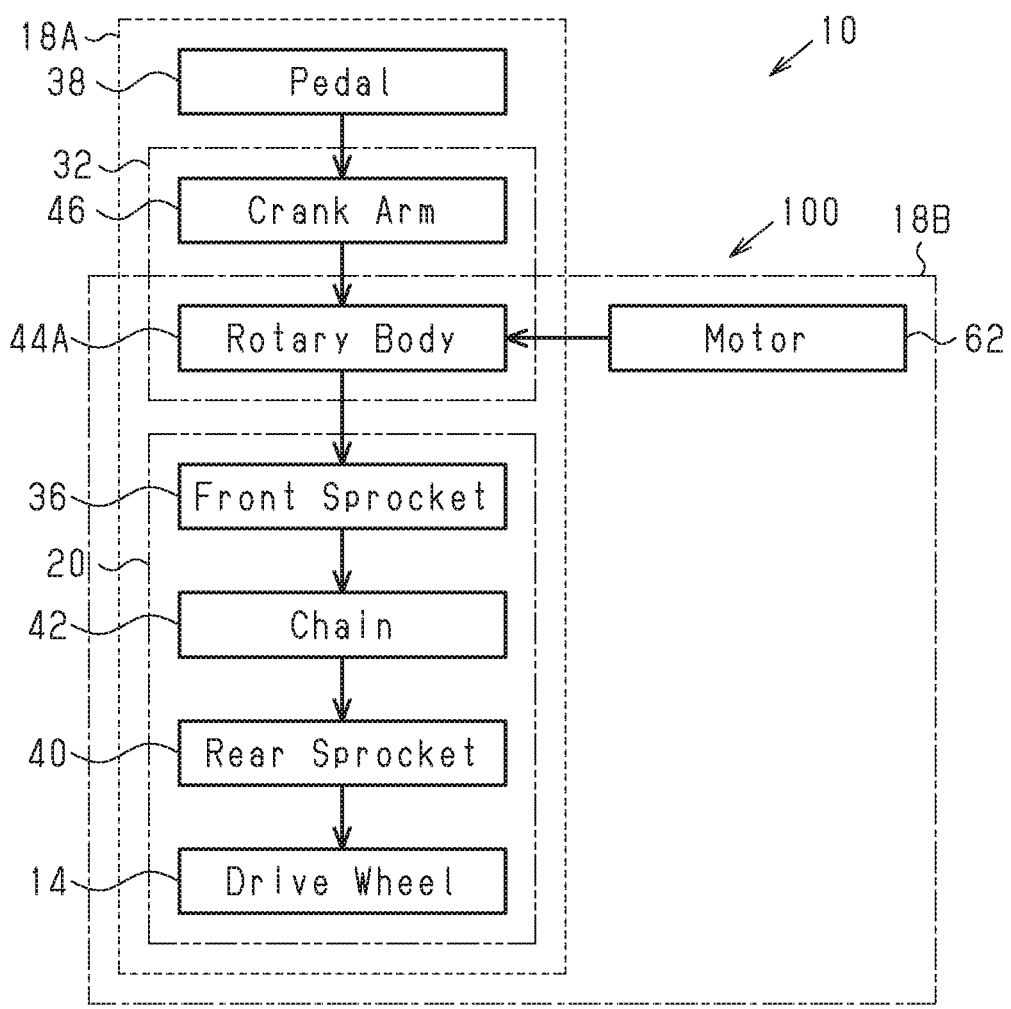
FIG. 9 is a schematic block diagram showing a human power transmission path of the bicycle in accordance with a fourth embodiment.

With reference to FIGS. 3, 4 and 9, the bicycle controller 70 of a fourth embodiment will now be described. Same reference characters are given to those components that are the same as the corresponding components of the first embodiment. Such components will not be described in detail. The bicycle controller 70 of the fourth embodiment has the same structure as the bicycle controller 70 of the first embodiment but differs in the control executed by the electronic control unit 72. In the present embodiment, the power transmission path between the motor 62 and the rotary body 44 does not include a one-way clutch.

The bicycle 10 includes a first power transmission path 18A and a second power transmission path 18B. The first power transmission path 18A extends from the pedals 38, which are for human power, to the rear wheel 14. The pedals 38 serve as an input for human power. In one example, the first power transmission path 18A includes the pedals 38, the crank arms 46, a first rotary body 44A, the gear change mechanism 20, and the rear wheel 14. The first rotary body 44A includes a crankshaft. The second power transmission path 18B extends from the motor 62, which provides assistance to human power, to the rear wheel 14. In one example, the second power transmission path 18B includes the motor 62, the gear change mechanism 20, and the rear wheel 14. The second power transmission path 18B can include a speed reduction mechanism between the motor 62 and the first rotary body 44A.

The controller 70 shown in FIG. 3 controls the drive unit 100. The drive unit 100 is configured to transmit the rotational of the crank 32 to the motor 62. The electronic control unit 72 is configured to control the load produced by the motor 62 in accordance with the angular acceleration DC of the first rotary body 44A, which is included in the first power transmission path 18A. More specifically, in steps S17 and S22 of FIG. 4, the electronic control unit 72 calculates the load amount of the motor 62. In steps S18 and S23, the electronic control unit 72 decreases the output TM of the motor 62 to stop providing assistance with the motor 62, and has the motor 62 perform a braking operation so that the motor 62 functions as a load. When the electronic control unit 72 performs a braking operation with the motor 62, energy generated by the motor 62 may be disposed of. However, it is preferred that the motor 62 perform a regenerative operation to store energy in the battery 52. In this case, the braking operation of the motor 62 includes a regenerative operation when the output TM of the motor is lowered in accordance with the angular acceleration DC of the first rotary body 44A. Preferably, the controller 70 controls the motor 62 so that the load amount becomes greater in step S18 than in step S23. The fourth embodiment has the same advantages as the first embodiment.

Fifth Embodiment

Figure 10:
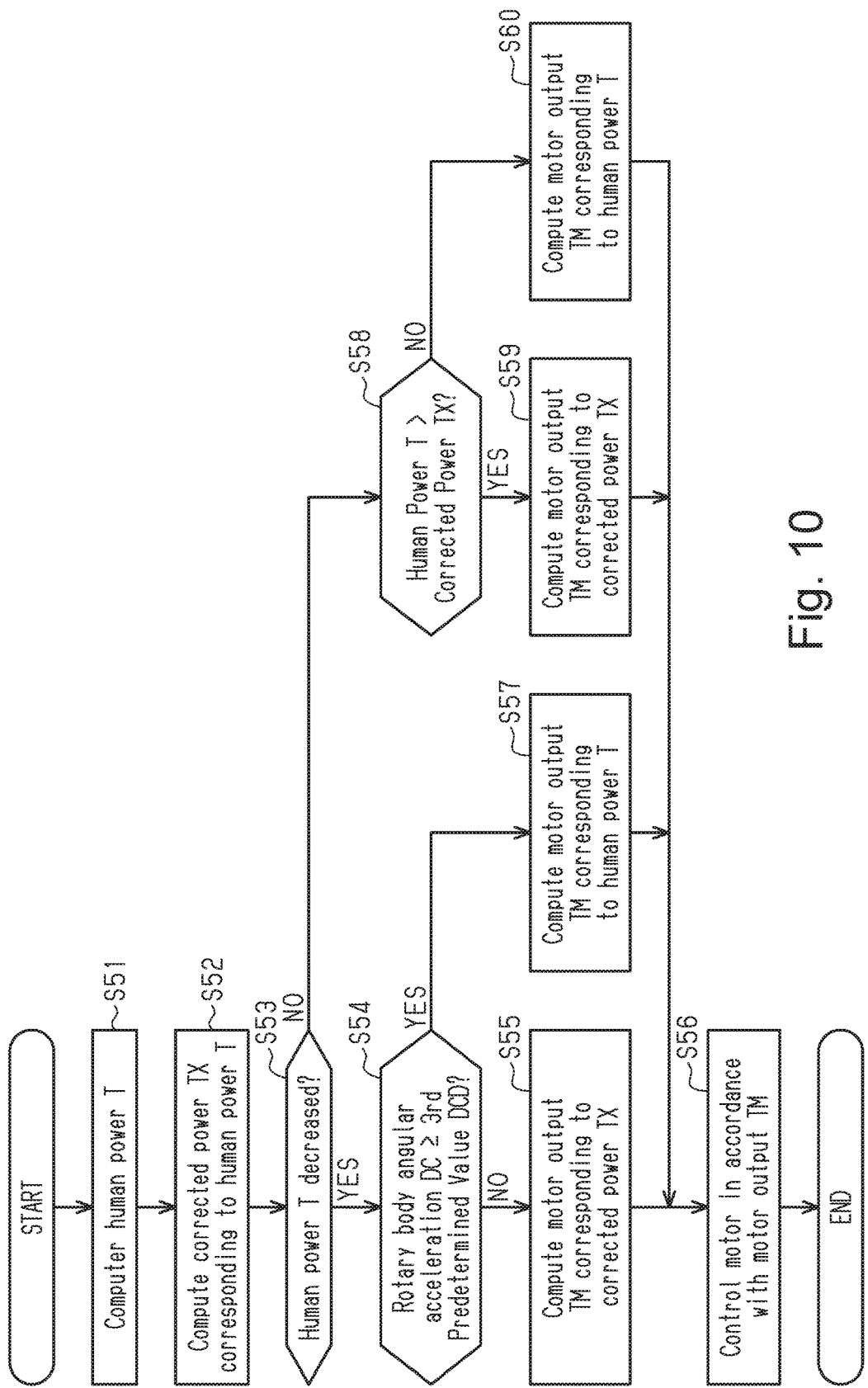
FIG. 10 is a flowchart of a motor control executed by the electronic control unit in accordance with a fifth embodiment.

With reference to FIG. 10, the bicycle controller 70 of a fifth embodiment will now be described. Same reference characters are given to those components that are the same as the corresponding components of the first embodiment. Such components will not be described in detail. The bicycle controller 70 of the fifth embodiment has the same structure as the bicycle controller 70 of the first embodiment but differs in the control executed by the electronic control unit 72.

The electronic control unit 72 is configured to control the motor 62 in accordance with the human power T. The electronic control unit 72 is configured to change the response speed of the motor 62 with respect to changes in the human power T (hereafter, referred to as "the response speed K") when the human power T decreases in accordance with the angular acceleration DC of the rotary body 44. The human power T decreases when the crank 32 rotates so that the phase of the crank 32 is shifted from a middle position to the top dead center or the bottom dead center. The electronic control unit 72 is configured to control the response speed K to be lower when the human power T decreases than when the human power increases to limit decreases in the output TM of the motor 62 when the human power T decreases. This decreases changes in the output TM of the motor 62.

The electronic control unit 72 is configured to increase the response speed K when the angular acceleration DC of the rotary body 44 becomes higher than or equal to a third predetermined value DCD. The human power T decreases when the rotation of the crank 32 shifts the phase of the crank 32 from a middle position to the top dead center or the bottom dead center. Thus, the output TM of the motor 62 is apt to decrease when the human power T decreases. When the rear wheel 14 slips or spins as the human power T decreases, the electronic control unit 72 is configured to reduce the output TM of the motor 62 by increasing the response speed K when the angular acceleration DC indicates slipping or spinning.

When the crank arms 46 of the bicycle 10 pass by the top dead center or bottom dead center, the electronic control unit 72 is configured to stop execution of the control for reducing the output TM of the motor 62 in accordance with the angular acceleration DC of the rotary body 44. In other words, when the change in the human power T shifts from a decrease to an increase, the electronic control unit 72 stops the process for increasing the response speed K.

The motor control executed by the electronic control unit 72 will now be described. The motor control is repeated in predetermined cycles as long as the electronic control unit 72 is supplied with power.

In step S51, the electronic control unit 72 computes the human power T. Then, in step S52, the electronic control unit 72 computes a corrected power TX from the human power T and proceeds to step S53. In step S52, the electronic control unit 72 uses a first-order low-pass filter to compute the corrected power TX that corresponds to the human power T. The first-order low-pass filter includes a time constant. Thus, the computed corrected power TX is delayed from changes in the human power T in accordance with the time constant.

In step S53, the electronic control unit 72 determines whether or not the human power T has decreased. For example, the electronic control unit 72 determines that the human power T has decreased when the human power T in the present computation cycle is smaller than the human power T in the previous computation cycle.

When determining in step S53 that the human power T has decreased, the electronic control unit 72 proceeds to step S54 and determines whether or not the angular acceleration DC of the rotary body 44 is higher than or equal to the third predetermined value DCD. When determining that the angular acceleration DC of the rotary body 44 is less than the third predetermined value DCD, the electronic control unit 72 proceeds to step S55 and computes the output TM of the motor 62 that corresponds to the corrected power TX computed in step S52. Then, the electronic control unit 72 proceeds to step S56. In step S56, the electronic control unit 72 controls the motor 62 in accordance with the output TM of the motor 62 and then executes the routine again from step S51 after a predetermined cycle.

When determining that the angular acceleration DC of the rotary body 44 is higher than or equal to the third predetermined value DCD in step S54, the electronic control unit 72 proceeds to step S57 and computes the output TM of the motor 62 corresponding to the human power T. Subsequently, the electronic control unit 72 proceeds to step S56 to control the motor 62 in accordance with the output TM of the motor 62 and then executes the routine again from step S51 after a predetermined cycle. Thus, when the angular acceleration DC of the rotary body 44 is higher than or equal to the third predetermined value DCD, the response speed K of the output T of the motor 62 is higher than that when using the corrected power TX.

When determining in step S53 that the human power T has not decreased in step S53, the electronic control unit 72 proceeds to step S58 and determines whether or not the human power T is larger than the corrected power T. When determining in step S58 that the human power T is larger than the corrected power TX, the electronic control unit 72 proceeds to step S59 and computes the output TM of the motor 62 corresponding to the human power T. Subsequently, the electronic control unit 72 proceeds to step S56 to control the motor 62 in accordance with the output TM of the motor 62 and then executes the routine again from step S51 after a predetermined cycle.

When determining in step S58 that the human power T is smaller than or equal to the corrected power TX, the electronic control unit 72 proceeds to step S60 and computes the output TM of the motor 62 corresponding to the corrected power TX. Subsequently, the electronic control unit 72 proceeds to step S56 to control the motor 62 in accordance with the output TM of the motor 62 and then executes the routine again from step S51 after a predetermined cycle. In this manner, when the human power T is increasing, the motor 62 is controlled in accordance with the larger one of the human power T and the corrected power TX. The fifth embodiment has the same advantages as the first embodiment.

Modified Examples

It should be apparent to those skilled in the art that the present invention may be embodied in many other specific forms without departing from the spirit or scope of the invention. For example, some of the components may be omitted from the components described in the embodiments (or one or more forms of the embodiments). Further, components in different embodiments may be appropriately combined. The scope of the present invention and equivalence of the present invention are to be understood with reference to the appended claims.

Figure 11:
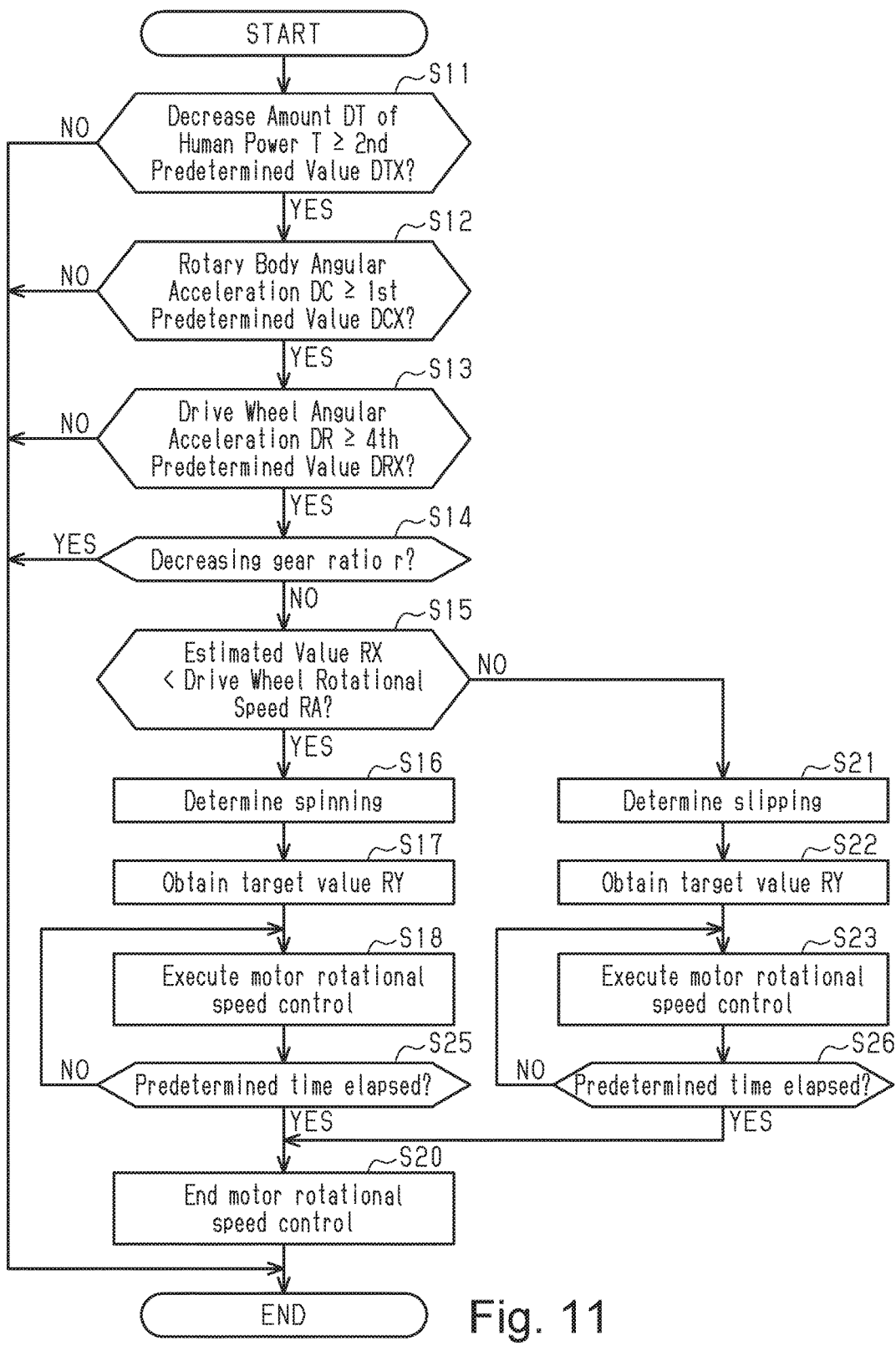
FIG. 11 is a flowchart of a third control executed by the electronic control unit in accordance with a first modified example.

The first control of the first embodiment can be modified to a third control shown in FIG. 11. In the third control, in accordance with a predetermined time, the electronic control unit 72 stops execution of the control for reducing the output TM of the motor 62 in accordance with the angular acceleration DC of the rotary body 44. More specifically, the electronic control unit 72 executes step S25 of FIG. 11 instead of step S19 of FIG. 4. If the electronic control unit 72 determines in step S25 that the predetermined time has elapsed from when execution of the motor rotational speed control was started, then the electronic control unit 72 proceeds to step S20 and ends the motor rotational speed control. Further, the electronic control unit 72 executes step S26 of FIG. 11 instead of step S24 of FIG. 4. If the electronic control unit 72 determines in step S26 that a predetermined time has elapsed from when execution of the motor rotational speed control was started, the electronic control unit 72 proceeds to step S20 and ends the motor rotational speed control. In this case, the motor rotational speed control is continued in step S25 or step S26 until a predetermined time elapses from when the motor rotational speed control is executed.

In the first and second embodiments, the electronic control unit 72 can have the motor 62 perform a braking operation when reducing the output TM of the motor 62 in accordance with the angular acceleration DC of the rotary body 44. In this case, the power transmission path between the motor 62 and the rotary body 44 does not include the one-way clutch. The braking operation includes a regenerative operation. In the rotational speed control of the motor 62 executed when spinning occurs, the electronic control unit 72 is configured to reduce the output TM of the motor 62 and has the motor 62 perform a braking operation to apply a load to the rotational force transmitted to the human power transmission path 18. Further, in the rotational speed control of the motor 62 executed when slipping occurs, the electronic control unit 72 is configured to reduce the output TM of the motor 62 and has the motor 62 perform a braking operation to apply a load to the rotational force transmitted to the human power transmission path 18. When the motor 62 performs a braking operation, the electronic control unit 72 can dispose energy. However, it is preferred that the regenerative energy be stored in the battery 52. Further, it is preferred that the motor 62 be controlled so that the load is larger in step S18 than in step S23.

In the second embodiment, the motor 62 can be omitted from the bicycle 10.

In the second embodiment, the electronic control unit 72 can execute a control similar to steps S18 or S23 of the first control in addition to the brake control in steps S31 and S32 of the second control.

In the fourth embodiment, the electronic control unit 72 can control the load produced by the motor 62 in accordance with the angular acceleration DC of a second rotary body included in the second power transmission path 18B instead of the angular acceleration DC of the first rotary body 44A. The second rotary body is one selected from a group of the motor 62, the front sprocket 36, the chain 42, the rear sprocket 40, and the rear wheel 14. When the second power transmission path 18B includes a speed reduction mechanism that is located between the motor 62 and the first rotary body 44A, the second rotary body can be selected from the rotary bodies of the speed reduction mechanism. In this case, the first sensor 76 outputs a signal corresponding to the rotational speed of the second rotary body. However, only the subject of detection is changed from the first rotary body 44A to the second rotary body. Otherwise, there are no changes to the configuration of the first sensor 76.

In each of the above embodiments, when reducing the output TM of the motor 62 in accordance with the angular acceleration DC of the first rotary body 44A, the electronic control unit 72 can lower the output TM of the motor 62 in steps. More specifically, in steps S18, S19, S23, and S24 of FIG. 4 and steps S18, S31, S23, and S32 of FIG. 6, the electronic control unit 72 reduces the output TM of the motor 62 in steps until the estimated value RX reaches the target value RY.

In each of the above embodiments, the electronic control unit 72 can use the rotational speed RA of the rear wheel 14 before the angular acceleration DC becomes higher than or equal to the first predetermined value DCX to stop the control that reduces the output TM of the motor 62 in accordance with the angular acceleration DC of the rotary body 44. More specifically, in steps S19 and S24 of FIG. 4, when the rotational speed RA of the rear wheel 14 becomes equal to the rotational speed RA taken before the angular acceleration DC became higher than or equal to the first predetermined value DCX, the electronic control unit 72 proceeds to step S20 and ends the rotational speed control of the motor 62. Further, in steps S31 and S32 of FIG. 6, when the rotational speed RA of the rear wheel 14 becomes equal to the rotational speed RA taken before the angular acceleration DC became higher than or equal to the first predetermined value DCX, the electronic control unit 72 proceeds to step S33 and ends the brake control.

In each of the above embodiments, as long as the transmission 50 is configured to change the gear ratio r, the transmission 50 can be arranged in the power transmission path between the crankshaft and the front sprocket 36. Alternatively, the transmission 50 can be arranged on the rear wheel 14. Such a transmission 50 includes, for example, a planetary gear mechanism. When the transmission 50 is arranged in the power transmission path between the crankshaft and the front sprocket 36, the transmission 50 can be an internal hub transmission. The planetary gear mechanism can be changed to a planetary roller mechanism. The hub gear can change the gear ratio r by changing the connected gears of the planetary gear mechanism and can be a differential planetary gear mechanism that changes the gear ratio r by rotating the gears of the planetary gear mechanism with a motor.

In the modified examples described above, the second transmission 50B can be changed to a hub gear arranged in the power transmission path between the crankshaft and the front sprocket 36. Further, the first transmission 50A can be a hub gear arranged in the rear wheel 14.

In each of the above embodiments, the rotary bodies 44 and 44A can be modified to include one of the pedals 38, the crank arms 46, the front sprocket 36, the chain 42, and the rear sprocket 40. The rotary bodies 44 and 44A can each be one of a pedal shaft and a pedal body. In this case, a first sensor detects the angular acceleration of the pedal body relative to the pedal shaft or the angular acceleration of the pedal body relative to the pedal shaft. When the bicycle includes a hub gear around the axle 14A of the rear wheel 14, the rotary body 44 can be changed to a rotary body included in the hub gear. As long as the rotary body is included between the input, to which human power is input, and the portion coupled to the rear wheel 14, any rotary body can be used as the rotary bodies 44 and 44A.

In each of the above embodiments, the electronic control unit 72 can compute the riding resistance of the bicycle 10 from the rotational speed RA of the rear wheel, the rotational speed of the crankshaft, and the human power T and also determine whether the rear wheel 14 is slipping or spinning from the change amount of the riding resistance per unit time. The riding resistance can be obtained by subtracting the momentum input to the bicycle 10 from the momentum output from the bicycle 10. The momentum output from the bicycle 10 can be computed from the rotational speed RA of the rear wheel 14 and the weight of the bicycle 10 and the rider. The momentum input to the bicycle 10 can be computed from the human power T and the rotational speed of the crankshaft. When the riding resistance suddenly changes, for example, when the change amount of the riding resistance per unit time is larger than a predetermined value, there is a high probability that the rear wheel 14 is slipping or spinning. In addition to or instead of the processes of steps S11 to S14, the electronic control unit 72 can determine whether or not the change amount of the riding resistance of the bicycle 10 per unit time is larger than the predetermined value.

Figure 12:
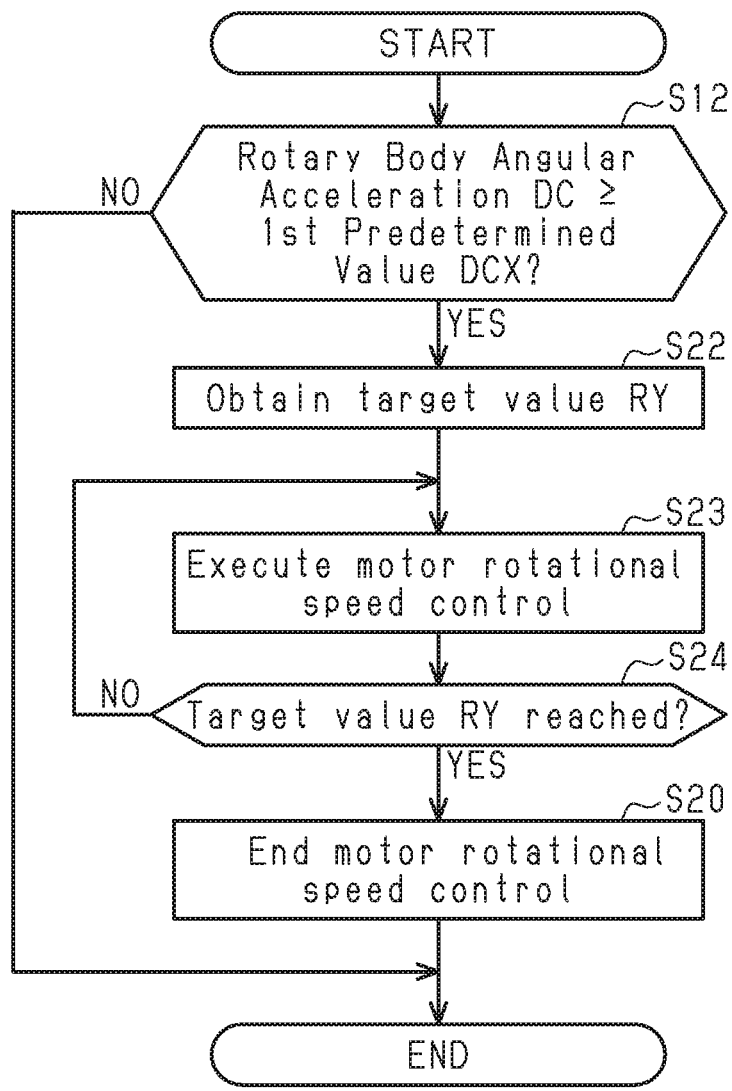
FIG. 12 is a flowchart of a fourth control executed by the electronic control unit in accordance with a second modified example.

The first control of the first embodiment can be modified to a fourth control shown in FIG. 12. In the fourth control, the processes of steps S11 and S13 to S19 of FIG. 4 are omitted. When the angular acceleration DC of the rotary body 44 becomes higher than or equal to the first predetermined value DCX, the electronic control unit 72 reduces the output TM of the motor 62. In the fourth control, the motor 62 can function as a load like in the fourth embodiment. The first predetermined value can be a value at which slipping of the rear wheel 14 does not occur. In this case, before slipping occurs, the output TM of the motor 62 is lowered and the motor 62 functions as a load. This reduces slipping of the rear wheel 14.

Figure 13:
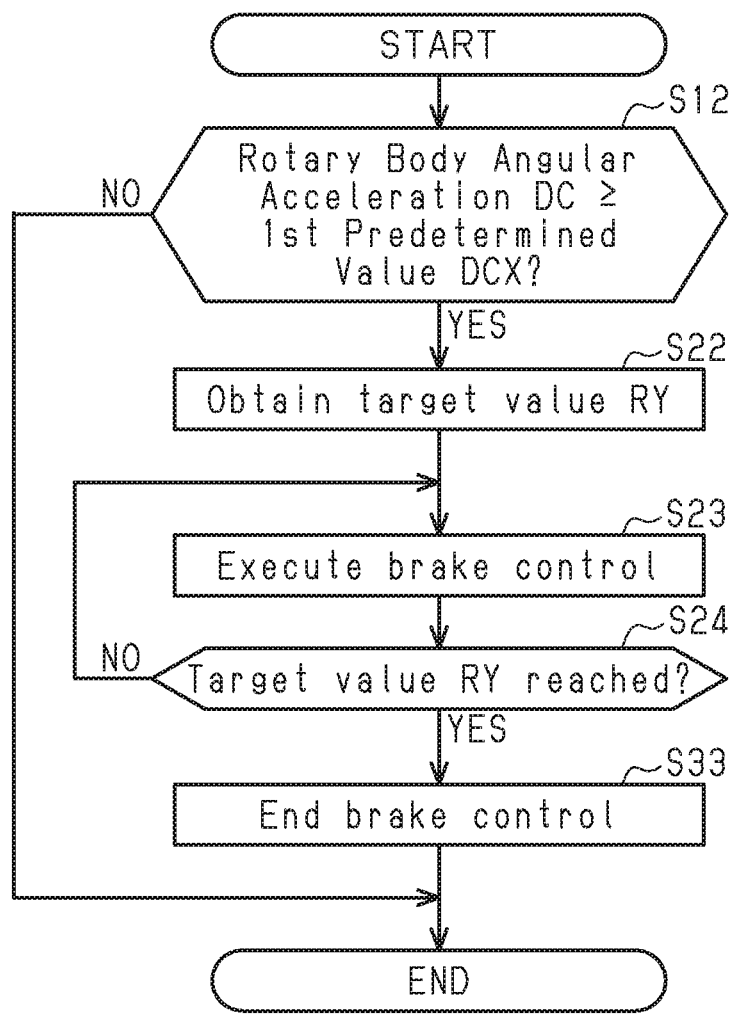
FIG. 13 is a flowchart of a fifth control executed by the electronic control unit in a third modified example.

The second control of the second embodiment can be modified to a fifth control shown in FIG. 13. In the fifth control, the processes of steps S11, S13 to S17, S21, S31, and S19 of FIG. 6 are omitted. When the angular acceleration DC of the rotary body 44 becomes higher than or equal to the first predetermined value DCX, the electronic control unit 72 is configured to apply the brake to the rear wheel 14 with the brake device 92. In the second control and the fourth control, the motor 62 can function as a load like in the fourth embodiment. The first predetermined value can be a value at which slipping of the rear wheel 14 does not occur. In this case, before slipping occurs, the output TM of the motor 62 is lowered and the motor 62 functions as a load. This reduces slipping of the rear wheel 14.

In the first control of FIG. 4, at least one of steps S11, S13, S14, S16, and S21 can be omitted. Alternatively, in the first control of FIG. 4, the processes of steps S15 to S19 and S21 can be omitted. Further, in the first control of FIG. 4, any one of the processes of steps S11, S13, S14, S16, and S21 and the processes of steps S15 to S19 and S21 can be omitted. The omission of a step allows for the omission of the sensor used to obtain the information required to process the omitted step.

In the second control of FIG. 6, at least one of steps S1, S13, S14, S16, and S21 can be omitted. Alternatively, in the second control of FIG. 6, the processes of steps S15 to S17, S31, S19, and S21 can be omitted. Further, in the second control of FIG. 6, any one of the processes of steps S11, S13, S14, S16, and S21 and the processes of steps S15 to S17, S31, S19, and S21 can be omitted. The omission of a step allows for the omission of the sensor used to obtain the information required to process the omitted step.

In the first, third, and fourth embodiments, the electronic control unit 72 reduces the output of the motor 62 or has the motor 62 function as a load until the rotational speed RA of the rear wheel 14 becomes equal to the target value RY. Instead, the output TM of the motor 62 can be lowered for a predetermined time or the motor 62 can function as a load for a predetermined time. Further, in the second embodiment, the electronic control unit 72 can operate the brake mechanism 94 until the target speed RA becomes equal to the target value RY. Instead, the brake mechanism 94 can be operated for a predetermined time.

Figure 14:
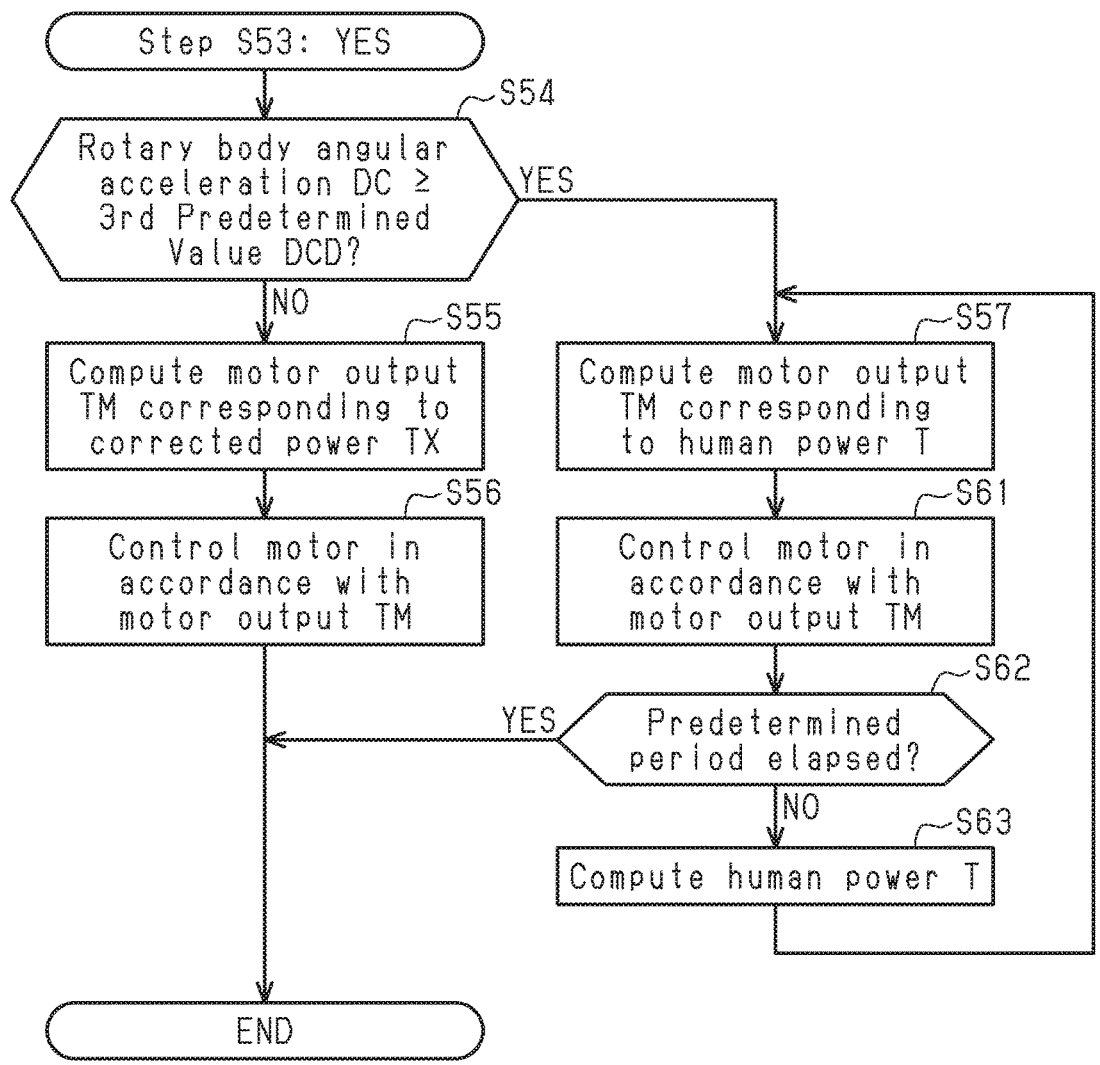
FIG. 14 is a flowchart of a motor control executed by the electronic control unit in accordance with a fourth modified example.

The motor control of the fifth embodiment can be modified to the motor control shown in FIG. 14. In the motor control of FIG. 14, the electronic control unit 72 stops execution of the control for reducing the output TM of the motor 62 in accordance with the angular acceleration DC of the rotary body 44 for a predetermined time. After increasing the response speed K, the electronic control unit 72 stops execution of the control for increasing the response speed K when a predetermined period elapses. More specifically, when determining in step S53 that the human power T is decreasing, the electronic control unit 72 proceeds to step S54 and determines whether or not the angular acceleration DC of the rotary body 44 is higher than or equal to the third predetermined value DCD. When determining that the angular acceleration DC of the rotary body 44 is lower than the third predetermined value DCD, the electronic control unit 72 proceeds to step S55 and computes the output TM of the motor 62 corresponding to the corrected power TX computed in step S52. Then, the electronic control unit 72 proceeds to step S56 and controls the motor 62 in accordance with the output TM of the motor 62. After a predetermined cycle, the electronic control unit 72 executes the routine again from step S51. Upon determining that the angular acceleration DC of the rotary body 44 is higher than or equal to the third predetermined value DCD in step S54, the electronic control unit 72 proceeds to step S57. In step S57, the electronic control unit 72 computes the output TM of the motor 62 corresponding to the human power T and then proceeds to step S61. In step S61, the electronic control unit 72 controls the motor 62 in accordance with the output TM of the motor 62 and then proceeds to step S62. In step S62, the electronic control unit 72 determines whether or not a predetermined time has elapsed from when the control for reducing the output of the motor 62 in accordance with the angular acceleration DC of the rotary body 44 was started. For example, the electronic control unit 72 determines whether or not the duration of an affirmative determination in step S54 has exceeded a predetermined period. When the predetermined period has elapsed in step S62, the electronic control unit 72 executes the routine again from step S51. When the predetermined period has not elapsed in step S62, the electronic control unit 72 proceeds to step S63 and computes the human power T. Then, the electronic control unit 72 repeats the processes from step S57. In this manner, after increasing the response speed K, the electronic control unit 72 keeps the response speed K high until a predetermined period elapses. When the predetermined period elapses after increasing the response speed K, the electronic control unit 72 returns the response speed K to the response speed K at which slipping or spinning of the rear wheel 14 did not occur.

Figure 15:
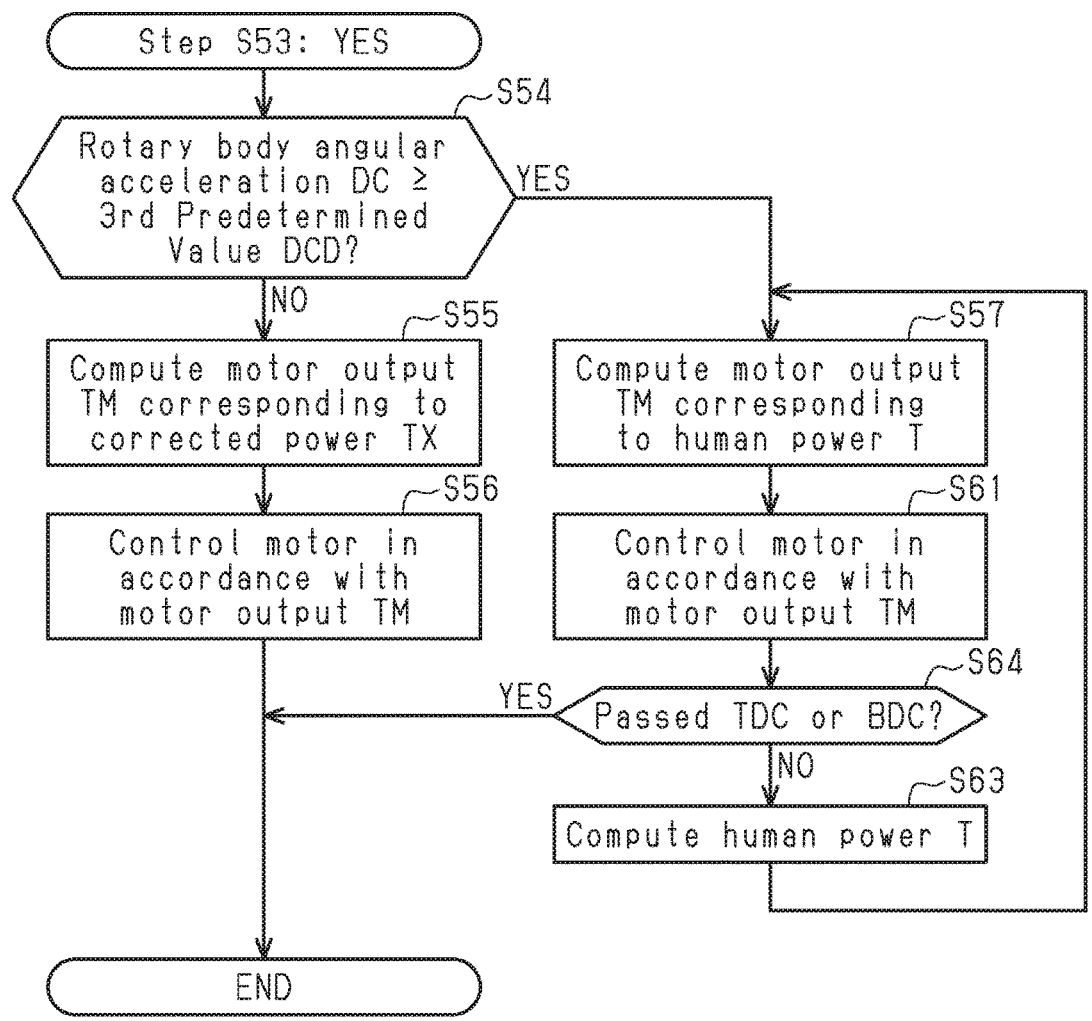
FIG. 15 is a flowchart of a motor control executed by the electronic control unit in accordance with a fifth modified example.

The motor control of the modified example shown in FIG. 14 can be modified to the motor control shown in FIG. 15. In the motor control of FIG. 15, after increasing the response speed K, the electronic control unit 72 stops execution of the control for increasing the response speed K after the crank arms 46 of the bicycle 10 passes by the top dead center or the bottom dead center. More specifically, upon determining in step S53 that the human power T is decreasing, the electronic control unit 72 proceeds to step S54 and determines whether or not the angular acceleration DC of the rotary body 44 is higher than or equal to the third predetermined value DCD. Upon determining that the angular acceleration DC of the rotary body 44 is lower than the third predetermined value DCD, the electronic control unit 72 proceeds to step S55 and computes the output TM of the motor 62 corresponding to the corrected power TX computed in step S52. Then, the electronic control unit 72 proceeds to step S56 and controls the motor 62 in accordance with the output TM of the motor 62. After a predetermined cycle, the electronic control unit 72 executes the routine again from step S51. Upon determining that the angular acceleration DC of the rotary body 44 is higher than or equal to the third predetermined value DCD in step S54, the electronic control unit 72 proceeds to step S57. In step S57, the electronic control unit 72 computes the output TM of the motor 62 corresponding to the human power T and then proceeds to step S61. In step S61, the electronic control unit 72 controls the motor 62 in accordance with the output TM of the motor 62 and then proceeds to step S64. In step S64, the electronic control unit 72 determines whether or not the crank arms 46 have passed the top dead center or the bottom dead center. When the crank arms 46 have passed the top dead center or the bottom dead center, the electronic control unit 72 executes the routine again from step S51. When the crank arms 46 have not passed the top dead center or the bottom dead center in step S64, the electronic control unit 72 proceeds to step S63 and computes the human power T. Then, the electronic control unit 72 repeats the processes from step S57. In this manner, after increasing the response speed K, the electronic control unit 72 keeps the response speed K high until the crank arms 46 pass by the top dead center or the bottom dead center. After increasing the response speed K, when the crank arms 46 pass the top dead center or the bottom dead center, the electronic control unit 72 returns the response speed K to the response speed K at which slipping or spinning of the rear wheel 14 did not occur.

Figure 16:
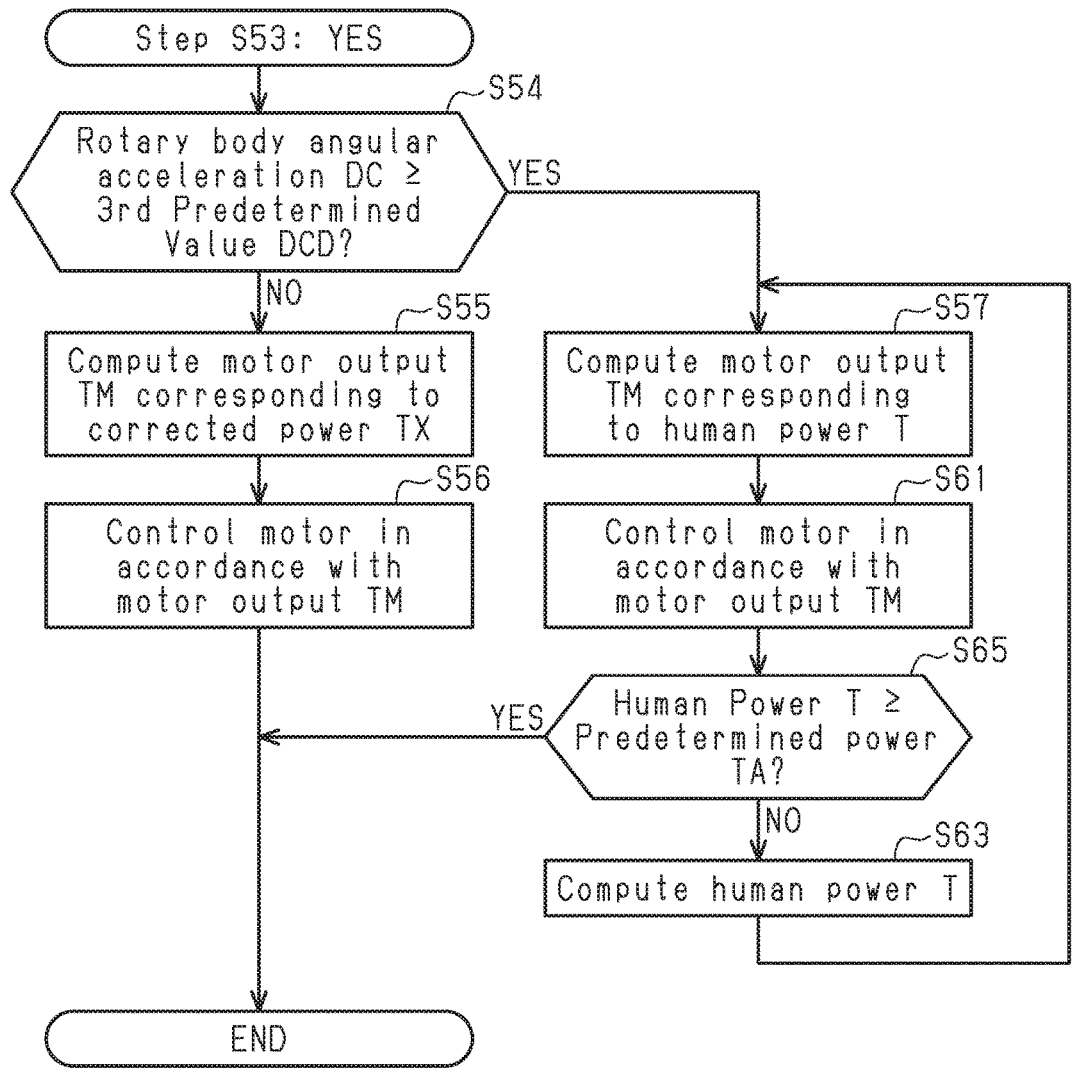
FIG. 16 is a flowchart of a motor control executed by the electronic control unit in accordance with a sixth modified example.

The motor control of the modified example shown in FIG. 14 can be modified to the motor control shown in FIG. 16. In the motor control of FIG. 16, the electronic control unit 72 is configured to stop execution of the control for reducing the output TM of the motor 62 in accordance with the angular acceleration DC of the rotary body 44 when the human power T becomes higher than or equal to a predetermined power TA. More specifically, upon determining in step S53 that the human power T is decreasing, the electronic control unit 72 proceeds to step S54 and determines whether or not the angular acceleration DC of the rotary body 44 is higher than or equal to the third predetermined value DCD. Upon determining that the angular acceleration DC of the rotary body 44 is lower than the third predetermined value DCD, the electronic control unit 72 proceeds to step S55 and computes the output TM of the motor 62 corresponding to the corrected power TX computed in step S52. Then, the electronic control unit 72 proceeds to step S56 and controls the motor 62 in accordance with the output TM of the motor 62. After a predetermined cycle, the electronic control unit 72 executes the routine again from step S51. Upon determining that the angular acceleration DC of the rotary body 44 is higher than or equal to the third predetermined value DCD in step S54, the electronic control unit 72 proceeds to step S57. In step S57, the electronic control unit 72 computes the output TM of the motor 62 corresponding to the human power T and then proceeds to step S61. In step S61, the electronic control unit 72 controls the motor 62 in accordance with the output TM of the motor 62 and then proceeds to step S65. In step S65, the electronic control unit 72 determines whether or not the human power T has become larger than or equal to the predetermined power TA. When the human power T has become larger than or equal to the predetermined power TA in step S65, the electronic control unit 72 executes the routine again from step S51. When the human power T has not become larger than or equal to the predetermined power TA in step S65, the electronic control unit 72 proceeds to step S63 and computes the human power T. Then, the electronic control unit 72 repeats the processes from step S57. In this manner, after increasing the response speed K, the electronic control unit 72 keeps the response speed K high until the human power T becomes larger than or equal to the predetermined power TA. After increasing the response speed K, when the human power T becomes larger than or equal to the predetermined power TA, the electronic control unit 72 returns the response speed K at which slipping or spinning of the rear wheel 14 did not occur.

Figure 17:
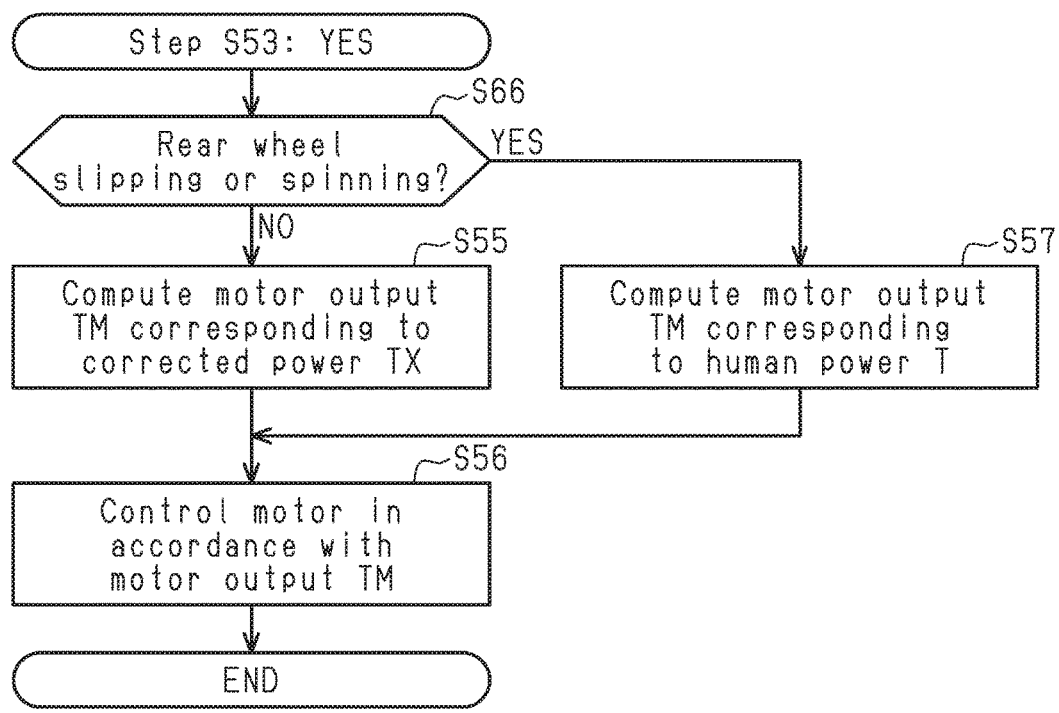
FIG. 17 is a flowchart of a motor control executed by the electronic control unit in accordance with a seventh modified example.

The motor control of the fifth embodiment can be modified to the motor control shown in FIG. 17. In the motor control of FIG. 17, when the rear wheel 14 of the bicycle slips or spins and the human power T decreases, the electronic control unit 72 increases the response speed K of the motor 62 with respect to the change in the human power T. More specifically, upon determining in step S53 that the human power T is decreasing, the electronic control unit 72 proceeds to step S66 and determines whether or not the rear wheel 14 is slipping or spinning. Upon determining that the rear wheel 14 is not slipping or spinning, the electronic control unit 72 proceeds to step S55 and computes the output TM of the motor 62 corresponding to the corrected power TX computed in step S52. Then, the electronic control unit 72 proceeds to step S56 and controls the motor 62 in accordance with the output TM of the motor 62. After a predetermined cycle, the electronic control unit 72 executes the routine again from step S51. When determining in step S66 that the rear wheel 14 is slipping or spinning, the electronic control unit 72 proceeds to step S57. In step S57, the electronic control unit 72 computes the output TM of the motor 62 corresponding to the human power T and then proceeds to step S56. In step S56, the electronic control unit 72 controls the motor 62 in accordance with the output TM of the motor 62 and then executes the routine again from step S51. Thus, when the rear wheel 14 of the bicycle slips or spins, the response speed K of the motor 62 corresponding to a change in the human power T is increased when the human power T decreases. This allows the output of the motor 62 to be easily lowered. The determination of slipping or spinning of the rear wheel 14 in step S53 can be performed using the angular acceleration DC of the rotary body 44, the rotational speed of the rear wheel 14, or the load applied to the rear wheel 14. Further, the difference in the rotational speed between the front wheel 12 and the rear wheel 14 can be used to determine whether or rear wheel 14 is slipping or spinning. Any configuration can be employed as long as slipping or spinning of the rear wheel 14 can be determined.

In the fifth embodiment, when the angular acceleration DC of the rotary body 44 is determined to be higher than or equal to the third predetermined value DCD, the time constant can be decreased to increase the response speed K. When the time constant is "0," the output of the motor 62 is equal to the computed output TM of the motor 62 corresponding to the human power T.

Figure 18:
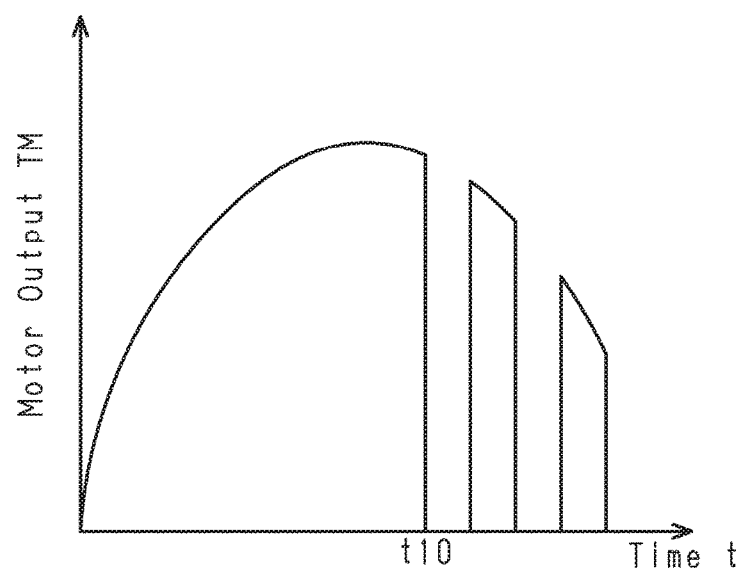
FIG. 18 is a timing chart showing one example of a motor control executed by the electronic control unit in accordance with an eighth modified example.

In each of the above embodiments, the electronic control unit 72 can control the motor 62 in accordance with the human power T of the motor 62 and lower the output TM of the motor 62 by repetitively increasing and decreasing the output TM of the motor 62 in accordance with the angular acceleration DC of the rotary body 44. FIG. 18 is a timing chart showing the increasing and decreasing of the output TM of the motor 62. Time t10 in FIG. 18 corresponds to when execution of the motor rotational speed control starts as the angular acceleration DC of the rotary body 44 becomes higher than or equal to the first predetermined value DCX. Time t10 in FIG. 18 indicates when the control of the motor 62 is started in accordance with the output TM of the motor corresponding to the human power T as the angular acceleration DC of the rotary body 44 becomes higher than or equal to the third predetermined value DCD in the fifth embodiment. Subsequent to time t10, the electronic control unit 72 repetitively increases or decreases the output TM of the motor 62 by switching, once every predetermined cycles, between a state in which the output TM of the motor 62 corresponds to the human power T and a state in which the driving of the motor 62 is stopped. In the fifth embodiment, the electronic control unit 72 can repetitively increase and decrease the output TM of the motor 62 by switching, once every predetermined cycles, between a state in which the output TM of the motor 62 corresponds to the corrected power TX and a state in which the output TM of the motor 62 corresponds to the human power T.

In the above modified examples, the output TM of the motor 62 can be repetitively increased and decreased by repeating the control for stopping the driving of the motor 62 and the control for driving the motor 62 at the output TM of the motor 62 corresponding to the human power T.

In each of the above embodiments, the bicycle drive device 60 can include a speed reduction mechanism located between the motor 62 and the rotary body 44 or 44A.

The bicycle controller 70 in each of the above embodiments is also applicable to a drive device control for a bicycle of a type that drives the front wheel 12. In such a case, the drive wheel is the front wheel.

In each of the above embodiments, the gear change mechanism 20 can be omitted. In such a case, the electronic control unit 72 in the first to third embodiments does not perform step S14 of the first and second controls.

Generally, a controller such as controller 70 can be provided which controls a brake device that brakes a drive wheel. The controller comprises an electronic control unit that brakes the drive wheel with the brake device in accordance with an acceleration of a first rotary body included in a first power transmission path extending from an input for human power to the drive wheel or in accordance with an acceleration of a second rotary body included in a second power transmission path extending from a motor, which provides assistance to the human power, to the drive wheel.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle controller comprising:
an electronic control unit configured to reduce an output of a motor, which is configured to assist in propulsion of a bicycle, upon detecting an increase in an angular acceleration of a rotary body included in a human power transmission path extending from an input portion for human power to a coupling portion coupled to a drive wheel.

2. The bicycle controller according to claim 1, wherein the rotary body includes a crankshaft.

3. The bicycle controller according to claim 1, wherein the electronic control unit is configured to perform a braking operation using the motor when reducing the output of the motor in accordance with the angular acceleration of the rotary body.

4. The bicycle controller according to claim 3, wherein the electronic control unit is configured to perform a regenerative operation as at least a part of the braking operation.

5. The bicycle controller according to claim 1, further comprising:
a first sensor configured to output a signal corresponding to a rotational speed of the rotary body,
the electronic control unit is configured to control the motor in accordance with the signal outputted from the first sensor.

6. The bicycle controller accordant to claim 1, wherein the electronic control unit is configured to control the motor in accordance with the human power.

7. The bicycle controller according to claim 6, further comprising:
a sensor configured to output a signal corresponding to the human power,
the electronic control unit is configured to control the motor in accordance with the signal output from the sensor.

8. The bicycle controller according to claim 1, wherein the electronic control unit is configured to reduce the output of the motor upon determining the angular acceleration has become higher than or equal to a first predetermined value.

9. The bicycle controller according to claim 1, wherein the electronic control unit is configured to reduce the output of the motor upon determining the angular acceleration has become higher than or equal to a first predetermined value and, at the same time, a decrease amount of the human power per unit time has become larger than or equal to a second predetermined value.

10. The bicycle controller according to claim 1, wherein the electronic control unit is configured to reduce the output of the motor in accordance with a crank phase.

11. The bicycle controller according to claim 10, further comprising:
a third sensor configured to output a signal corresponding to the crank phase,
the electronic control unit is configured to control the motor in accordance with the signal output from the third sensor.

12. The bicycle controller according to claim 10, wherein the electronic control unit is configured to reduce the output of the motor in accordance with the crank phase upon determining the angular acceleration has become higher than or equal to a first predetermined value.

13. The bicycle controller according to claim 10, wherein when reducing the output of the motor in accordance with the angular acceleration, the electronic control unit is configured to control the motor to reduce the output of the rotary body more greatly upon determining the crank phase corresponds to a middle position between a top dead center and a bottom dead center than upon determining the crank phase corresponds to one of the top dead center and the bottom dead center.

14. A bicycle controller comprising:
an electronic control unit configured to reduce an output of a motor, which is configured to assist in propulsion of a bicycle, in accordance with an angular acceleration of a rotary body included in a human power transmission path extending from an input portion for human power to a coupling portion coupled to a drive wheel,
when reducing the output of the motor in accordance with the angular acceleration, the electronic control unit being configured to reduce the output of the motor in steps.

15. The bicycle controller according to claim 1, wherein when reducing the output of the motor in accordance with the angular acceleration of the rotary body, the electronic control unit is configured to brake the drive wheel with a brake device that brakes the drive wheel.

16. A bicycle controller comprising:
an electronic control unit configured to reduce an output of a motor, which is configured to assist in propulsion of a bicycle, in accordance with an angular acceleration of a rotary body included in a human power transmission path extending from an input portion for human power to a coupling portion coupled to a drive wheel,
the human power transmission path including a gear change mechanism, and
the rotary body being located at an upstream side of the gear change mechanism in the human power transmission path.

17. The bicycle controller according to claim 16, wherein when reducing the output of the motor in accordance with the angular acceleration of the rotary body, the electronic control unit is configured to control the motor in accordance with a rotational speed of the drive wheel and a rotational speed of a crank.

18. The bicycle controller according to claim 17, wherein the electronic control unit is configured to reduce the output of the motor more greatly upon determining the rotational speed of the drive wheel is higher than an estimated value of the rotational speed of the drive wheel calculated from the rotational speed of the rotary body and a gear ratio of the bicycle than upon determining the rotational speed of the drive wheel is lower than or equal to the estimated value.

19. The bicycle controller according to claim 16, wherein the electronic control unit is configured to reduce the output of the motor in accordance with the angular acceleration of the rotary body upon determining the gear change mechanism is not functioning to decrease a gear ratio of the bicycle.

20. The bicycle controller according to claim 1, wherein the electronic control unit is configured to control the motor in accordance with the human power, and the electronic control unit is configured to change a response speed of the motor with respect to a change in the human power as the human power decreases in accordance with the angular acceleration of the rotary body.

21. The bicycle controller according to claim 20, wherein the electronic control unit is configured to increase the response speed upon determining the angular acceleration of the rotary body becomes higher than or equal to a third predetermined value.

22. The bicycle controller according to claim 21, wherein the electronic control unit is configured to stop execution of a control for increasing the response speed upon determining a predetermined period elapses after increasing the response speed.

23. The bicycle controller according to claim 21, wherein the electronic control unit is configured to stop execution of a control for increasing the response speed upon determining a crank arm of the bicycle passes one of a top dead center and a bottom dead center after increasing the response speed.

24. The bicycle controller according to claim 1, wherein the electronic control unit is configured to control the motor in accordance with the human power and reduce the output of the motor by repetitively increasing and decreasing the output of the motor in accordance with the angular acceleration of the rotor.

25. The bicycle controller according to claim 1, wherein in accordance with a rotational speed of the drive wheel, the electronic control unit is configured to stop execution of a control for reducing the output of the motor in accordance with the angular acceleration of the rotary body.

26. The bicycle controller according to claim 1, wherein the electronic control unit is configured to reduce the output of the motor upon determining the angular acceleration becomes higher than or equal to a first predetermined value;
in accordance with a rotational speed of the drive wheel, the electronic control unit is configured to stop execution of a control for reducing the output of the motor in accordance with an angular acceleration of the drive wheel; and
in accordance with one of the rotational speed of the drive wheel and a rotational speed of a crank before the angular acceleration becomes higher than or equal to the first predetermined value, the electronic control unit is configured to stop execution of the control for reducing the output of the motor in accordance with the angular acceleration of the rotary body.

27. The bicycle controller according to claim 1, wherein in accordance with a predetermined time, the electronic control unit is configured to stop execution of a control for reducing the output of the motor in accordance with the angular acceleration of the rotary body.

28. The bicycle controller according to claim 1, wherein when a crank arm of the bicycle passes one a top dead center and a bottom dead center, the electronic control unit is configured to stop execution of a control for reducing the output of the motor in accordance with the angular acceleration of the rotary body.

29. The bicycle controller according to claim 1, wherein when the human power becomes larger than or equal to a predetermined power, the electronic control unit is configured to stop execution of a control for reducing the output of the motor in accordance with the angular acceleration of the rotary body.

30. A bicycle controller that controls a drive unit configured to transmit rotation of a crank to a motor, the bicycle controller comprising:
an electronic control unit configured to control a load produced by the motor in accordance with an angular acceleration of a first rotary body included in a first power transmission path extending from an input for human power to a drive wheel or an angular acceleration of a second rotary body included in a second power transmission path extending from a motor, which is configured to assist in propulsion of the bicycle, to the drive wheel.

31. A bicycle drive device including the bicycle controller according to claim 1, and further comprising:
the motor.

* * * * *